United States Patent
Colon et al.

(10) Patent No.: US 12,058,157 B1
(45) Date of Patent: Aug. 6, 2024

(54) ANOMALOUS COMPUTER ACTIVITY DETECTION AND PREVENTION

(71) Applicant: Amazon Technologies, Inc., Seattle, WA (US)

(72) Inventors: Brendan Cruz Colon, Seattle, WA (US); Lance Dennis Leishman, Bonney Lake, WA (US); Matthew Michael Sommer, Issaquah, WA (US); Alexander Noble Adkins, Catlettsburg, KY (US); Samantha Felice, Reno, NV (US); Christopher Miller, Seattle, WA (US); Dennis Naylor Brown, Lake Forest Park, WA (US); Diana Keller, Seattle, WA (US); Michael Alexander Cecil, Tucson, AZ (US); Michael Chad McClure, Huntington, WV (US); Joel Booker, Bellevue, WA (US); Adam Edward Powers, Dublin, CA (US); Dorion Carroll, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 17/831,854

(22) Filed: Jun. 3, 2022

(51) Int. Cl.
*H04L 9/40* (2022.01)

(52) U.S. Cl.
CPC ........ *H04L 63/1425* (2013.01); *H04L 63/102* (2013.01)

(58) Field of Classification Search
CPC .......................... H04L 63/1425; H04L 63/102
See application file for complete search history.

(56) References Cited

U.S. PATENT DOCUMENTS

| | | | | |
|---|---|---|---|---|
| 7,225,343 | B1* | 5/2007 | Honig | G06F 16/13 |
| | | | | 713/193 |
| 10,187,409 | B1* | 1/2019 | Averbuch | G06F 21/55 |
| 10,623,427 | B2* | 4/2020 | Oz | G06F 21/552 |
| 10,726,123 | B1* | 7/2020 | Mookiah | G06F 21/554 |
| 11,487,875 | B1* | 11/2022 | Alexander | G06F 21/567 |
| 11,716,338 | B2* | 8/2023 | Elyashiv | G06N 3/08 |
| | | | | 726/23 |

(Continued)

OTHER PUBLICATIONS

Jyothsna, V. V. R. P. V., Rama Prasad, and K. Munivara Prasad. "A review of anomaly based intrusion detection systems." International Journal of Computer Applications 28.7 (2011): 26-35.*

(Continued)

*Primary Examiner* — Jimmy H Tran
(74) *Attorney, Agent, or Firm* — K&L Gates LLP

(57) ABSTRACT

Devices and techniques are generally described for anomalous computer activity detection. In various examples, first computer activity data associated with a first account may be determined. A first linear detection event that corresponds to the first computer activity data may be determined. In some examples, a set of gradient-based data associated with the first linear detection event may be determined. The set of gradient-based data may represent comparative analysis of the first computer activity data with computer activity data of other accounts. In some examples, first data representing the first linear detection event and the set of gradient-based data may be generated. In various cases, network access for the first account may be disabled based on the first data.

20 Claims, 10 Drawing Sheets

(56) References Cited

U.S. PATENT DOCUMENTS

| | | | | |
|---|---|---|---|---|
| 2002/0188864 | A1* | 12/2002 | Jackson | H04L 63/1408 |
| | | | | 726/4 |
| 2005/0037733 | A1* | 2/2005 | Coleman | H04L 63/1416 |
| | | | | 455/411 |
| 2007/0169194 | A1* | 7/2007 | Church | H04L 63/1416 |
| | | | | 726/23 |
| 2008/0098476 | A1* | 4/2008 | Syversen | H04L 63/0227 |
| | | | | 726/23 |
| 2012/0180126 | A1* | 7/2012 | Liu | G06F 21/81 |
| | | | | 726/22 |
| 2012/0240185 | A1* | 9/2012 | Kapoor | H04L 41/0866 |
| | | | | 726/1 |
| 2014/0283047 | A1* | 9/2014 | Dixit | H04L 63/1425 |
| | | | | 726/23 |
| 2015/0047032 | A1* | 2/2015 | Hannis | H04L 63/1491 |
| | | | | 726/23 |
| 2017/0034193 | A1* | 2/2017 | Schulman | H04L 63/1416 |
| 2017/0054744 | A1* | 2/2017 | Mumcuoglu | H04L 63/1425 |
| 2017/0155674 | A1* | 6/2017 | Seo | G06F 11/34 |
| 2017/0230391 | A1* | 8/2017 | Ferguson | G06N 7/01 |
| 2017/0251012 | A1* | 8/2017 | Stockdale | H04L 63/10 |
| 2017/0264628 | A1* | 9/2017 | Treat | H04L 43/04 |
| 2018/0248904 | A1* | 8/2018 | Villella | G06N 3/047 |
| 2019/0075123 | A1* | 3/2019 | Smith | G06N 3/006 |
| 2019/0379683 | A1* | 12/2019 | Overby | H04W 12/122 |
| 2020/0258004 | A1* | 8/2020 | Heimann | H04L 63/1433 |
| 2020/0285737 | A1* | 9/2020 | Kraus | G06F 21/552 |
| 2020/0285997 | A1* | 9/2020 | Bhattacharyya | G06N 7/00 |
| 2022/0052905 | A1* | 2/2022 | Vasseur | H04L 41/14 |
| 2023/0054186 | A1* | 2/2023 | Messous | H04L 63/1425 |
| 2023/0123157 | A1* | 4/2023 | Ramanan | H04L 63/1425 |
| | | | | 706/12 |
| 2023/0262077 | A1* | 8/2023 | Palmer | H04L 63/0245 |
| | | | | 726/13 |
| 2024/0089278 | A1* | 3/2024 | Claireaux | G06F 21/552 |

OTHER PUBLICATIONS

Aljawarneh, Shadi, Monther Aldwairi, and Muneer Bani Yassein. "Anomaly-based intrusion detection system through feature selection analysis and building hybrid efficient model." Journal of Computational Science 25 (2018): 152-160.*

Garcia-Teodoro, Pedro, et al. "Anomaly-based network intrusion detection: Techniques, systems and challenges." computers & security 28.1-2 (2009): 18-28.*

Jabez, Ja, and B. J. P. C. S. Muthukumar. "Intrusion Detection System (IDS): Anomaly detection using outlier detection approach." Procedia Computer Science 48 (2015): 338-346.*

* cited by examiner

ANOMALOUS COMPUTER ACTIVITY DETECTION AND PREVENTION

BACKGROUND

Denial-of-service (DOS) attacks, unauthorized data exfiltration, and other computer-network based attacks continue to grow year-over-year, putting pressure on online entities and network administrators to innovate in order to protect customers, revenue, and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
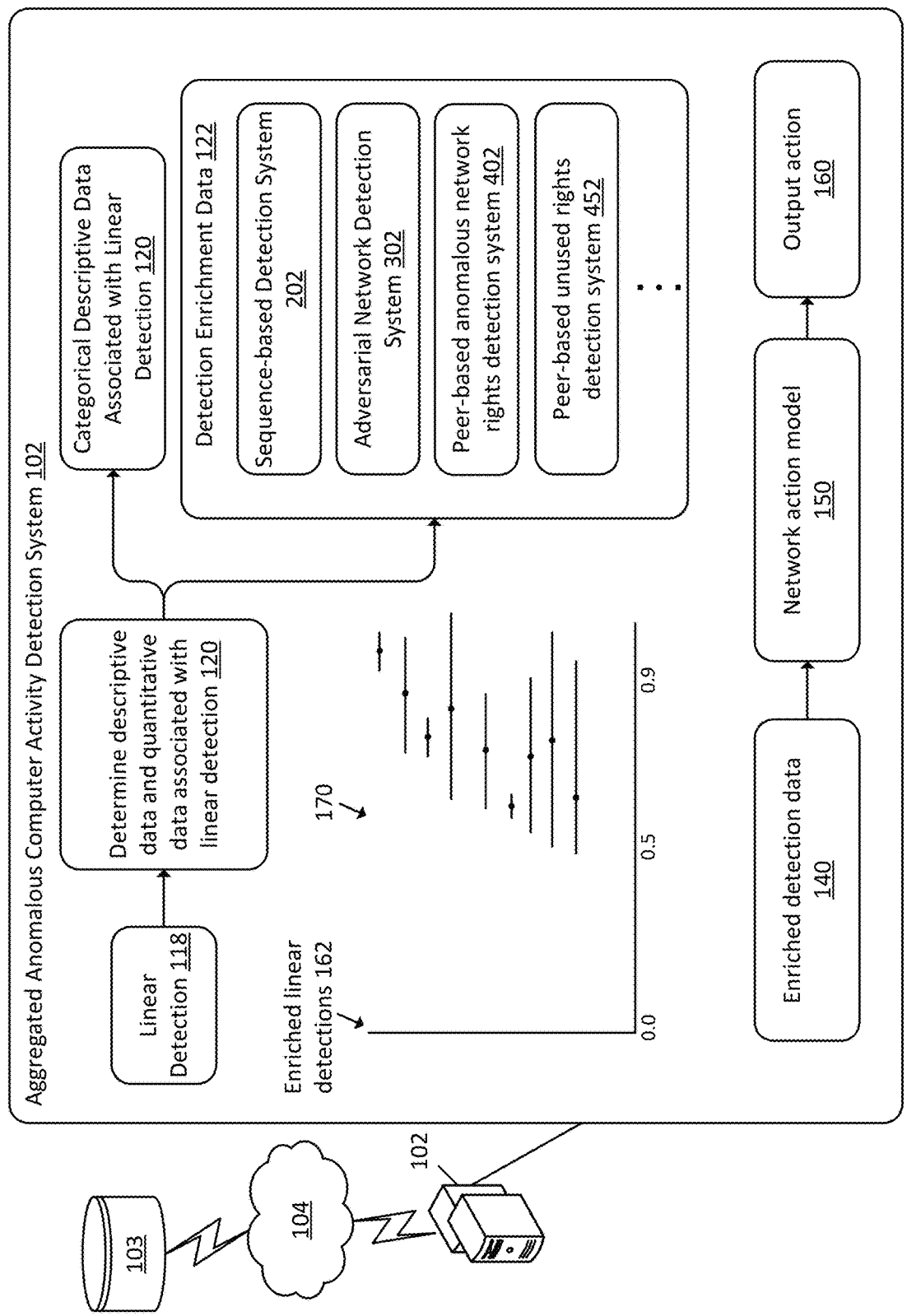
FIG. 1 is a block diagram illustrating an aggregated anomalous computer activity detection system, according to various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Perpetrators of cyber-attacks and/or other "fraudsters" continually attempt to modify their behavior and/or the characteristics of their attacks and/or fraudulent transactions in order to avoid detection by automated filters. As a result, technologies are continuously developed by fraud prevention and cyber-security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies, and vice versa.

In some cases, attacks come from outside sources that gain access to secure networks through phishing, stolen credentials, etc. However, in some cases, the sources of attacks are insiders that are authorized users who take unauthorized actions (e.g., sensitive data exfiltration, etc.). In large computer networks and institutions, users cannot be individually monitored by system administrators to ensure that no bad actors are performing unauthorized operations. Accordingly, automatic computer systems may be used to monitor for network-based attacks. Network-based attacks may include data exfiltration (whether from an internal or external source), transactional fraud (e.g., concession abuse fraud, payment fraud, etc.), ransomware attacks, etc.

However, even such automated detection systems suffer shortcomings. For example, a typical automated network anomaly detection system may be a Boolean detection system indicating that action X has been performed Y (or more) times within Z timeframe. Such Boolean detections are referred to herein as "linear detections." However, such linear detection systems require careful planning and/or empirical testing to determine the appropriate actions to measure and the appropriate thresholds for such actions. If thresholds are set too low (e.g., for a read action on sensitive data, for example) high false positives (low precision) can result, where legitimate actions are flagged and/or prevented, ultimately wasting resources to investigate such false positives. Conversely, if thresholds are set too high, anomalous actions and/or network attacks may slip through undetected (low recall). Additionally, linear detections are not inherently descriptive, often times missing the entire sequence of computer actions that are the modus operandi of the attack as a result of focus on a specific action. Described herein, are techniques that may detect anomalous computer activity in order to detect and/or automatically prevent computer attacks. Anomalous computer activity may refer to any type of anomalous network action, as determined/defined by network administration policies and/or as determined by comparison with typical network usage patterns. For example, in some cases, anomalous computer activity may comprise unauthorized or unusual data access, exfiltration, unusual port usage, unauthorized and/or unusual scripting, etc.).

In various examples described herein, linear detections are enriched with data from other anomalous computer activity detection systems to provide an aggregated and holistic view of the computer activity of a particular account. In various examples, the particular enrichment data provided may relate to the particular linear detection. In various examples, one anomalous computer activity detection model may suffer from a blindspot. However, by aggregating signals from various different anomalous computer activity detection systems, a modus operandi of attack patterns may be determined, a root cause may be understood, and automated systems may be employed to categorize and/or disable the threat despite the shortcomings of any individual model and/or detection system.

In various examples, the types of signals incorporated by the aggregated anomalous computer activity detection systems described herein may generally be of two categories:

descriptive and gradient-based. Descriptive signals may be categorical variables indicating a type of account, a location associated with the account, a site associated with the account, individual(s) associated with the account, and any other desired categorical variables that describe the account and/or its properties. Gradient-based signals may be quantitative enrichments that place an account's behavior along a spectrum with respect to the computer activity of other accounts (e.g., using statistical analysis) to determine anomalous computer activity. Various examples of gradient-based signals described herein include anomalous computer activity during unusual hours, anomalous network rights provisioning, anomalous IP addresses and/or other hierarchical data being employed by an account, anomalous network skills usage, etc. It should be appreciated that the particular examples of gradient-based signals described herein are not an exhaustive list and the particular gradient-based and/or other quantitative signals used by the aggregated anomalous computer activity detection systems depends on the desired implementation.

In various examples, the particular enrichment signals determined for a particular linear detection violation may be determined based on hard-coded heuristics. However, in various other examples, a machine learning model such as a neural network may learn the relevant descriptive and/or gradient-based enrichment signals that are most pertinent to a particular linear violation.

Enriching linear detection data with relevant contextual signals, as described herein, enables sophisticated computer network threat detection of threats that are typically not detectable by human researchers and/or by using linear detections and/or individual models. Machine learning models and/or rule-based systems used for computer activity threat detection often have blind spots that can be exploited to allow sophisticated attacks that "fly under the radar." Additionally, a holistic understanding and/or representation of attack procedures are difficult to detect since a linear detection typically catches only one aspect and/or result of an attack without detecting a pattern of computer activity that forms the modus operandi of the attack. Due to the vast amount of computer activity data and large number of seemingly unrelated computer activity events, human researchers are unable to take into account all relevant actions and cannot detect all relevant correlations between seemingly unrelated events and/or threat patterns. The aggregated anomalous computer activity detection system and techniques described herein are able to overcome the limitations of human researchers and are able to generate highly-enriched data that shows connections between seemingly unrelated network events. Accordingly, the technical improvements described herein enable computer-implemented systems to detect network threat activity even when seemingly-unrelated individual actions appear to lack any correlation with computer network threats.

FIG. 1 is a block diagram illustrating example components of an aggregated anomalous computer activity detection system 102, according to various embodiments of the present disclosure. In various examples, one or more computing devices may implement the anomalous computer activity detection system 102. In examples where more than one computing device implements the anomalous computer activity detection system 102, the different computing devices may communicate with one another over a network 104. In various examples, each of the one or more computing devices used to implement anomalous computer activity detection system 102 may comprise one or more processors. The one or more computing devices used to implement anomalous computer activity detection system 102 may be configured in communication with at least one non-transitory computer readable memory 103 ("memory 103"). In at least some examples, the one or more computing devices used to implement anomalous computer activity detection system 102 may communicate with memory 103 over network 104. The memory 103 may store computer-readable instructions that, when executed by at least one processor of the one or more computing devices implementing anomalous computer activity detection system 102, may be effective to program the one or more processors to perform the various techniques described herein.

In various examples, network 104 is a wide area network, such as the Internet, while in other embodiments, the network 104 is a local area network (LAN) over which requests may be received. In some further embodiments network 104 is a combination of the Internet and a LAN.

Aggregated anomalous computer activity detection system 102 may monitor and/or may be configured in communication with various other systems that monitor the computer activity of a plurality of accounts. As described herein, accounts may be provisioned with various network rights. For example, a first account may have access to a first database and/or sub-network, while a second account may not be permitted to access the first database and/or sub-network. A second account may be permitted to modify values stored in a particular database, while a third account may not have access to the database (or may have only read-access to the database), and so on. The various computer actions (e.g., read, write, create, delete, open ports, perform actions, etc.) may be monitored as timestamped log data (e.g., application log data).

As previously described, a linear detection 118 may be a threshold that may be empirically or otherwise established to monitor the performance of some computer activity. For example, performing an action A (e.g., performing a read operation on a specified database) more than X times during Y timeframe may result in a linear detection 118. In various examples, the aggregated anomalous computer activity detection system 102 may determine various contextual data when a linear detection 118 occurs. The contextual data may be used to determine an appropriate action to take (e.g., output action 160), if any, in response to the linear detection 118.

Upon the occurrence of a linear detection 118, the descriptive data and/or the quantitative data (e.g., quantitative network data) that is associated with the linear detection 118 may be determined. The relevant descriptive data and/or quantitative data may be empirically determined and/or may be learned by a machine learning model as being relevant to the linear detection 118. For example, if a script has been executed to automate a particular action, triggering a linear detection 118, the descriptive data may indicate a level of network access of the account generating the script, a description of the account, one or more network addresses to which data is written by the account, etc. Quantitative data for the linear detection may represent an amount of data written per hour, a Z-score indicating a relative level of anomalousness of the scripting event relative to account peers, etc.

In various examples, categorical descriptive data associated with linear detection 118 may be descriptive data associated with the account. Examples, may include site, account tenure, historic linear detections, access level, etc. In various examples, a particular type of linear detection may be associated with specific descriptive data and/or with specific quantitative data. Accordingly, when a linear detection 118 occurs, the type of linear detection may be used to lookup the relevant descriptive data and/or quantitative data that are relevant to that type of linear detection. However, in other examples, the linear detection 118 (including any relevant data (e.g., X occurrences of Y type occurring within Z amount of time) may be provided to a machine learning model that may determine relevant categorical descriptive data and/or detection enrichment data 122.

Various types of detection enrichment data 122 may be associated with a particular linear detection. Detection enrichment data 122 may include gradient-based data and/or qualitative data that associate an account's actions along a spectrum with respect to other accounts' actions. Various example systems that may be used to generate such qualitative and/or quantitative data (e.g., gradient-based data) are described herein, although this list of example systems is not exhaustive. Additional systems may be developed and deployed in accordance with the desired implementation.

Figure 2A:
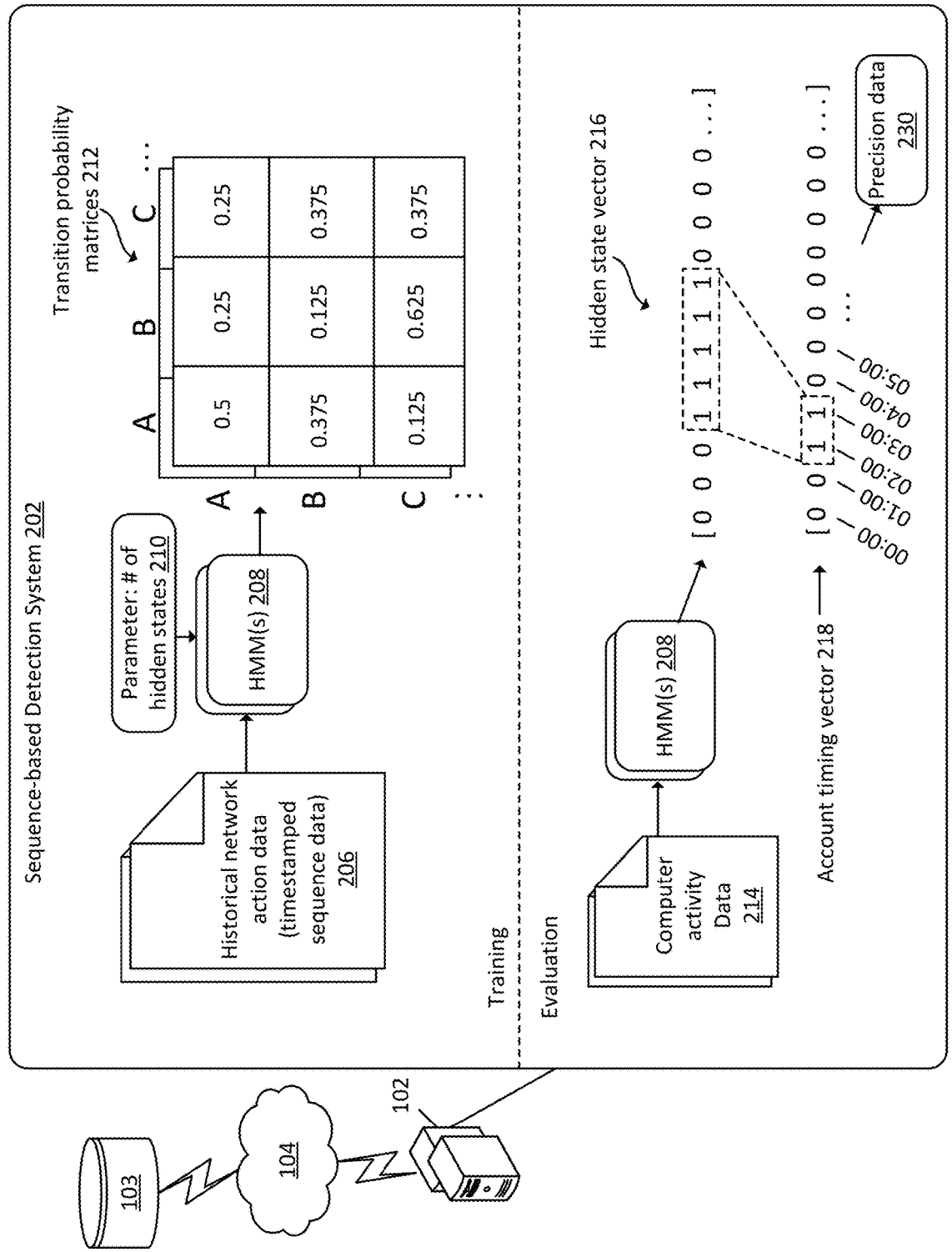
FIG. 2A illustrates a sequence-based detection system, according to various aspects of the present disclosure.
Figure 2B:
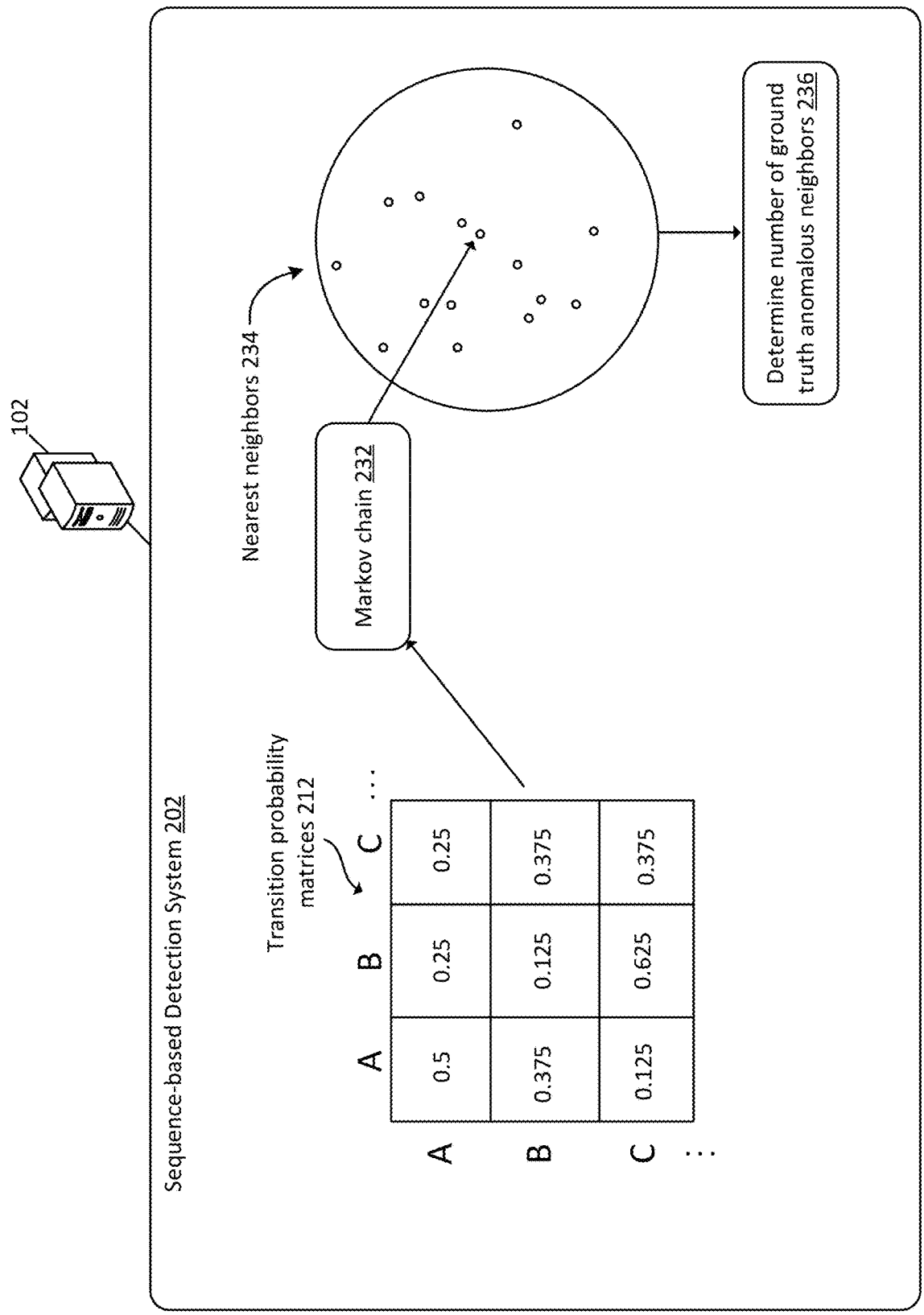
FIG. 2B is a block diagram illustrating detection of anomalous computer activity using a sequence-based detection system, in accordance with various aspects of the present disclosure.

An example of a system that may be used to determine and/or output detection enrichment data 122 may include sequence-based detection system 202 (described in FIGS. 2A, 2B). As described below, sequence-based detection system 202 may compare anomalous actions performed by an account over time and may correlate such anomalous actions with unusual hours during which the account is typically not associated with performing computer activity. In the sequence-based detection system 202, the gradient-based data may be a Z-score representing precision of the number of anomalous actions taken by the account that occurred at odd computer activity hours (for that account).

Another example of a system that may be used to determine and/or output detection enrichment data 122 may include adversarial network detection system 302. The adversarial network detection system 302 may be used to identify adversarial network addresses, phone numbers, and/or other hierarchical data. The prevalence of such adversarial data and its affiliation with an account may be used to enrich the linear detection 118.

Another example of a system that may be used to determine and/or output detection enrichment data 122 may include peer-based anomalous network rights detection system 402. The peer-based anomalous network rights detection system 402 may determine a relative level of anomalousness of an account's rights relative to that accounts peers and/or relative to other accounts that are associated with the same category as the subject account. The relative anomalousness of an account's rights profile may be expressed as a Z-score and/or standard deviation and may be used to enrich the linear detection.

Another example of a system that may be used to determine and/or output detection enrichment data 122 may include a peer-based unused rights detection system 452. The peer-based unused rights detection system 452 may determine anomalous skills usage (e.g., skill anomaly data) and/or may detect unused rights. Additionally, the peer-based unused rights detection system 452 and/or the peer-based anomalous network rights detection system 402 may be used to determine supervisory accounts that may themselves not be anomalous, but which have reports that are anomalous (e.g., anomalous accounts reporting to a non-anomalous account). The relative anomalousness of an account's skills profile (e.g., the skill anomaly data) and/or unused rights may be expressed as a Z-score and/or standard deviation and may be used to enrich the linear detection.

Other examples of quantitative data that may be included in the detection enrichment data 122 may include Z-scores related to account tenure, Z-scores related to historic alarms for an account, unique alarms triggered Z-scores, various Z-scores related to concessions provided by an account, new account concession rate Z-scores, a number of high risk rights that are anomalous to account category, data indicating most common events during a logged-in session, etc. Examples of qualitative data that may be included in the detection enrichment data 122 may include data describing rare copy-paste events associated with an account, email domains associated with concession bias for the account, unique IP addresses associated with account logins, unique ZIP codes associated with account log-ins, modeled account category from the peer-based anomalous network right detection system 402, data identifying other associated accounts (e.g., grouped with the subject account) with similar off-hour activity (e.g., determined using sequence-based detection system 202, etc. The foregoing examples of quantitative and qualitative data that may be included in the detection enrichment data 122 are merely examples. The actual signals will vary according to the available signals and the desired implementation.

Gradient-based quantitative data and/or qualitative data representing the detection enrichment data 122 may be aggregated together with the categorical descriptive data 120 and data representing the linear detection 118 to generate the enriched detection data 140. In various examples, the enriched detection data 140 (e.g., the linear detection 118 enriched with detection enrichment data 122 and categorical descriptive data 120) may be triaged and stored. In various examples, true positives may be identified from among the historical data (e.g., past enriched detection data 140). True positives are those linear detections 118 that correspond to a true, non-justified computer-based event or series of events (as opposed to a false positive). This historical data representing past detections (e.g., the stored enriched detection data 140) may be leveraged to determine co-occurring (e.g., temporally) detection enrichment data 122 that are correlated to the non-justified account activity. Standard error confidence bands may be used to determine with a high degree of precision that particular linear detections and/or particular enrichment signals (from among detection enrichment data 122) are strongly associated with true positives as more and more samples are considered. Accordingly, as more and more enriched detection data 140 is considered, a level of risk associated with the detection event having the qualities represented by the enriched detection data 140 may be determined based on a correspondence to the historical data and confidence bands for historical detection events.

Graph 170 may represent a plurality of enriched linear detections 162 along the y-axis (e.g., different unique combinations of linear detections and the particular quantitative and/or qualitative data, descriptive data 120, representing the enrichment signals associated with the particular linear detection). The x-axis of graph 170 may represent the percentage of accounts exhibiting the particular combination of linear detection and detection enrichment data 122 represents a true positive (e.g., non-justified computer-based activity). The lines plotted on graph 170 represent error confidence bands while the dots represent calculated true positive rates for each error confidence band. As more and more historical data corresponding to a particular combination of linear detection and enrichment signals is determined over time, the error confidence bands shrink (e.g., as sample size increases).

In various examples, network action model 150 may sort the various linear detection/enrichment combinations on the y-axis using the lower bound of the error bars. If the lower bound is above some predefined threshold (e.g., ≥0.9 or some other tunable threshold) a particular action may be automatically taken (e.g., disabling network and/or service access for the account, disabling data access, escalating a security ticket, etc.). Such sorting by the network action model 150 may allow the precision of a linear detection/ enrichment data combination to be considered while avoiding false positives (which may result from, for example, promoting a particular linear detection/enrichment data combination to result in automatic account deletion prematurely (i.e., before there is enough historical data to infer with high confidence that the linear detection/enrichment data combination is non-justified computer-based activity). However, the linear detection/enrichment data may be sorted using other techniques according to the desired implementation, beyond the specific example provided above.

A network action model 150 may optionally be used to determine the appropriate output action 160 for the enriched detection data 140. In various examples, the network action model 150 may include rule-based logic that may be specific to the various categorical descriptive data 120, the specific detection enrichment data 122, and/or to the linear detection 118. For example, different thresholds may apply to each different type of data. For example, precision scores output by the sequence-based detection system 202, if provided as part of the enriched detection data 140 for a particular linear detection, may be compared to a precision score threshold for the sequence-based detection system 202. Similarly, other types of detection enrichment data 122, categorical descriptive data 120, and/or linear detections 118 may each be subject to their own respective thresholds. In other examples, the network action model 150 may be a machine learning model (e.g., a neural network) that may be trained to predict an output action 160 for the input enriched detection data 140 (and/or a feature representation thereof). However, in various other examples, heuristics may be used to determine that enriched detection data 140 corresponds to historical data (e.g., a past linear detection event) indicating non-justified account activity and that an output action 160 should be taken.

The output action 160 may be an automated action. For example, network access, data access, and/or access to a particular computer-based service for the subject account may be programmatically disabled and/or modified, various computer-based operations may be constrained (e.g., CRUD operations), etc., based on the enriched detection data 140 as determined by the network action model 150. In various examples, modifying data access, computer-based service access, and/or data access may be referred to as modifying a data access profile of the account. In other examples, the enriched detection data 140 may be classified as a particular type of risk and/or may be routed to a particular data repository (associated with the class) and/or escalated between different categories for further investigation. In some examples, the output action 160 may comprise modifying an access profile associated with the subject account. In various examples, the output action 160 may include an overall risk score and/or a recommended remedial action. Notwithstanding the foregoing examples, the particular output actions 160 may depend on the desired implementation.

FIG. 2A illustrates a sequence-based detection system 202, according to various embodiments of the present disclosure. In various examples, the sequence-based detection system 202 may provide gradient-based data indicating anomalous computer activity data as an input to the aggregated anomalous computer activity detection system 102 of FIG. 1. The gradient-based data may be used to enrich a linear detection, in accordance with various aspects of the current disclosure.

In various examples described herein, an ensemble of Hidden Markov Models (HMMs) are deployed using a computer-implemented anomalous computer activity detection system 102 that are effective to automatically detect attack procedures. HMMs are a formal approach for creating probabilistic models to label sequences. HMMs traverse a linear sequence of events (e.g., timestamped computer actions) and assign a probability that the sequence correlates to some underlying state. For example, HMMs are ubiquitous in bioinformatics for their ability to predict genes (the underlying state) based on the sequence of DNA observed.

As used herein, computer activity refers to not only network activity such as opening and closing network communication ports, sending/receiving packets and/or other data, but also to any computer actions that may be tracked remotely. For example, application log data, CRUD operations (create, read, update, delete), system calls, and any other computer-based operation (alone, in combination with other events, and/or with attending metadata) may be considered computer activity and may serve as an input to one or more HMMs in the various systems and techniques described herein. The systems and techniques described herein are able to detect and model attack procedures and patterns that would not be apparent to a human analyzing the data using current techniques due to the multivariate nature of the problem and large amount of data processed using such techniques.

In various examples, a sequence of computer actions (e.g., network activity) is defined. The defined computer actions serving as input to the HMM depend on the particular implementation. Example actions may include particular system calls, CRUD operations, opening particular network ports, logins, access to particular databases (and/or CRUD operations within such databases), application log actions, etc., start times of various events, stop times of various events, etc. In addition, some actions may be qualified on the basis of defined conditions. For example, a particular read operation may only be considered a computer action for the purposes of input to the HMMs described herein if it relates to a particular type of data (e.g., sensitive personally-identifiable data). In another example, such a read action may be defined (for purposes of the HMM) as a separate computer-action relative to a different type of read action. In another example, actions may be qualified based on timing information (e.g., read operations happening within 3 seconds (or some other threshold) of one another) may be qualified as read_attempt_rapid.

Computer actions (as defined for the particular implementation of the anomalous computer activity detection systems and techniques described herein) may be intercalated based on timestamp data (defining a time at which each action occurred) to provide a chronologically accurate series of such actions. These actions may be further enriched by such metadata as the application name generating the action, notable deviations, and/or descriptions such as events happening within 3 seconds of each other, event type, etc.

Examples of events may include:
SimpleUserService—SignInAttempt (login attempt)
Rapid—CscUserAccountSummaryRead (User account summary read within three seconds of previous action)

All actions with their descriptions may be integer encoded yielding a large amount of action types (e.g., thousands). An ensemble of HMMs may be trained for a specific account (e.g., a specific account with network access) for actions in a trailing time period (e.g., four days, seven days, one day, or any other desired amount of time) with each HMM model leveraging different optimizer logic for defining a hidden state. For example, three HMMs may be implemented using Gaussian HMM, Gaussian Mixed Model HMM, and Multinomial HMM. In this example, the three HMMs are trained for each account being evaluated for anomalous computer activity. Each of the HMMs may be trained to classify actions as belonging to one of two possible hidden states (0 or 1). The number of hidden states may be a parameter of the HMM model and more than two hidden states may be selected, as desired. During training, each HMM model learns a transition probability matrix representing the probability of transitioning from a current action to a next action based on the sequence of actions used to train the HMM. A transition probability matrix is learned for each hidden state.

The anomalous computer activity detection system may correlate either hidden state value (e.g., 0 or 1, in the binary case) to anomalous computer activity (or known attack activity). In addition, the anomalous computer activity detection system may generate a timing vector for each account under evaluation. The timing vector may represent various time periods during each day of the week. For example, a timing vector may include an element for each hour of the day for each day of the week (e.g., 7×24=168 dimensions). In some examples, the timing vector may have binary values indicating whether (on average) a particular account has performed (or is otherwise associated with) greater than a threshold number of actions for the relevant element (e.g., for the relevant hour of the relevant day that corresponds to the vector element). For example, for a vector element representing 1:00 pm on Saturday, a 0 value may represent that the average number of actions taken by the account during the 1-2 pm hour on Sundays (e.g., based on 150 days of trailing data) is less than 3.5 (or some other desired threshold), while a 1 value may represent that the average number of actions taken by the account during the 1-2 pm hour on Sundays exceeds the threshold. Accordingly, the timing vector may represent hours of the week that are typically associated with account activity with a 1 (or 0, depending on the implementation) and hours of the week that are typically associated with account inactivity with a 0 (or 1, depending on the implementation).

The hidden state vector output by each HMM of the anomalous computer activity detection system may be correlated with the timing vector for the account under evaluation. If anomalous computer activity (e.g., a hidden state value of 1) is correlated with typical periods of inactivity (e.g., hours that are unusual for the particular account to be taking actions and/or hours with an absence of computer activity) this may be a strong indicator of an attack and/or fraudulent behavior. These techniques are particularly useful for detecting internally-perpetrated attacks since accounts are typically associated with similar timings of account activity from week-to-week. Accordingly, taking anomalous actions (as evidenced by the hidden state vector of the HMM) during unusual hours for account activity (as determined using the timing vector) may be highly correlated with an attack.

In various examples, the sequence-based detection system 202 may receive historical network action data 206 (e.g., historical computer activity). As previously described, the action data may be a timestamped sequence of actions (e.g., sequence data). The actions may be defined according to the desired implementation, but the actions generally refer to computer activity including any computer actions that may be remotely tracked. As previously described, some examples actions may include particular system calls, CRUD operations, opening particular network ports, logins, access to particular databases (and/or CRUD operations within such databases), application log actions, etc., start times of various events, stop times of various events, etc. In addition, some actions may be qualified on the basis of defined conditions. For example, a particular read operation may only be considered a computer action for the purposes of input to the HMMs described herein if it relates to a particular type of data (e.g., sensitive personally-identifiable data). In another example, such a read action may be defined (for purposes of the HMM) as a separate computer-action relative to a different type of read action. In another example, actions may be qualified based on timing information (e.g., read operations happening within 3 seconds (or some other threshold) of one another) may be qualified as read_attempt_rapid.

The number of hidden states 210 may be supplied as a parameter to the one or more HMMs 208. As previously described, in some cases, an ensemble of HMMs may be trained for each account being evaluated. Each HMM may leverage different optimizer logic defining a hidden state. Examples of HMM models may be Gaussian HMM, Gaussian Mixed Model HMM, Multinomial HMM, etc. During training, each HMM 208 may learn a transition probability matrix 212 for each hidden state. In some examples herein, the number of hidden states 210 may be selected as two. There may be a notion that one hidden state (e.g., 0) corresponds to normal computer activity, while the other hidden state (e.g., 1) corresponds to anomalous computer activity. However, there may be no way to tell, for each HMM 208, which hidden state value corresponds to which condition. For example, 0 may correspond to the "anomalous" activity state for one model, while 1 may correspond to the "anomalous" activity state for another model. As described in further detail below, a state transition that corresponds with unusually-timed activity (determined using account timing vector 218 (e.g., a binary timing vector)) may be used to disambiguate the hidden states.

Transition probability matrices 212 indicate the probability that an account that is currently taking a first network action will next take another network action. The transition probability matrices 212 are specific to a hidden state of the HMM(s) 208 and are learned using the historical network action data 206 (e.g., some past time period of actions taken by an account under evaluation). For example, if an account makes system call A, the transition probability matrices provides respective probabilities of the next action that will be taken by the account (e.g., next action probabilities). In the simple example depicted in FIG. 2A, if an account takes action A, there is a probability of 0.5 that the next action will again be action A, a probability of 0.375 that action B will be taken, and a probability of 0.125 that action C will be taken. Similarly, if an account takes action B, there is a probability of 0.25 that the next action taken will be action A, a probability of 0.125 that the next action taken will again be action B, and a probability of 0.625 that the next action taken will be action C, and so on.

Since there may be a large number (e.g., tens of thousands) of actions defined by the sequence-based detection system 202, the transition probability matrices 212 may be large resulting in an enormous amount of processing time and computational resource consumption at scale. Accordingly, for each account, the transition probability matrices 212 may only represent those actions that have actually been taken at least a threshold number of times (e.g., at least once) by the account to reduce the sparsity of the matrices and the complexity of computation. The transition probability matrices 212 may be stored in non-transitory computer readable memory 103 in association with account identifier data that uniquely identifies the account to which the transition probability matrices 212 pertain.

After training the HMM(s) 208 to determine the transition probability matrices 212 for a given account identifier (e.g., identifying an account), sequence-based detection system 202 may be ready for evaluation of the account. Computer activity data 214 may be received that is associated with computer actions taken by the account over a certain time period (e.g., the preceding 4 days or any other desired time period). The computer activity data 214 may be timestamped (with each action having a timestamp) and may be input into the HMM(s) 208. Each HMM 208 may generate a hidden state vector 216. In the example depicted in FIG. 2A, the hidden state vector 216 is a binary vector (e.g., the number of hidden states 110 is two) of [0 0 0 1 1 1 1 0 0 0 0 . . . ]. A hidden state value of 0 or 1 is predicted by the HMM 108 for each time stamp action. The hidden state value is determined based on the sequence of actions and represents whether the account is currently believed to be performing anomalous activity or whether the account is performing routine activity based on the transition probability matrices 212 and the computer activity data 214. However, the hidden state vector 216, without more, does not provide any information as to which state (0 or 1) corresponds to anomalous and which state corresponds to routine computer activity.

The sequence-based detection system 202 may determine an account timing vector 218 for the account. The account timing vector 218 represents various time periods during each day of the week. For example, the account timing vector 218 may include an element for each hour of the day for each day of the week (e.g., 24×7=168 dimensions (one dimension per unique hour of the week)). In some examples, the account timing vector 218 may have binary values indicating whether (on average) a particular account has performed (or is otherwise associated with) greater than a threshold number of computer actions for the relevant element of the account timing vector 218 (e.g., for the relevant hour of the relevant day that corresponds to the vector element). For example, for a timing vector element representing 1:00 pm on Saturday, a 0 value may represent that the average number of actions taken by the account during the 00:00-01:00 hour on Saturdays (e.g., based on 150 days (or some other desired number) of trailing data) is less than 2 (or some other desired threshold), while a 1 value may represent that the average number of actions taken by the account during the 00:00-01:00 hour on Saturdays exceeds the threshold. Accordingly, the timing vector may represent hours of the week that are typically associated with account activity with a 1 (or 0, depending on the implementation) and hours of the week that are typically associated with account inactivity with a 0 (or 1, depending on the implementation). In the example account timing vector 218, a 1 value may represent an hour/day combination typical of inactivity (e.g., an hour during which the account is typically not associated with a sufficiently high volume of computer actions, based on the predefined thresholds). Conversely, a 0 may represent an hour that is typical of activity for the account. For example, if the account is related to a system administrator, the 0 may represent an hour during which the system administrator is typically performing authorized network administration actions.

In the example depicted in FIG. 2A, the account timing vector 218 has 1 values at the 02:00 and 03:00 hours (e.g., of a certain day) indicating that the account is typically not associated with computer actions at these times. Additionally, the sequence-based detection system 202 may determine a correspondence between the values of the hidden state vector 216 and these elements of the account timing vector 218 (as denoted using the dashed boxes). The sequence-based detection system 202 may determine the correlation since each action (and thus each hidden state value of hidden state vector 216) is timestamped. The sequence-based detection system 202 may determine that the timestamps of the 1 values of the hidden state vector correspond to the hours having a 1 value of the account timing vector 218 (as represented using the dashed boxes). The sequence-based detection system 202 may disambiguate the binary values of the hidden state vector 216 (e.g., may determine which binary value corresponds to anomalous activity vs. which binary value corresponds to non-anomalous activity) by determining a correlation of these values with the periods typically related to inactivity. This disambiguation is predicated on the high correlation between odd hours (e.g., hours typically correlated with inactivity regarding a particular account) and network attacks/fraudulent activity. The account timing vectors 218 are generated for each account under evaluation. This is important as different accounts may be associated with different activity hours/days.

In the example depicted in FIG. 2A, the hidden state vector 216 transitions from 0 to 1 and remains at 1 during the hours typical of inactivity (e.g., 02:00-04:00). Accordingly, 1 may be determined as the hidden state value that corresponds to anomalous computer activity. In various examples, precision data 230 may be generated by the sequence-based detection system 202. The precision data 230 may be determined by determining a number of hidden state values indicating anomalous activity (e.g., the number of "1" values in the hidden state vector 216) that are also associated with times of inactivity (from the account timing vector 218) and dividing this number by the total number of hidden state values indicating anomalous activity. For example, if there are five "1" values in the hidden state vector 216 that also correspond to unusual timing (determined using timestamp values), but there are eleven total "1" values in the hidden state vector 216, the precision data 230 may be determined as the ratio 5/11=0.454545. In some examples, the precision data 230 may also be determined under the assumption that the other hidden state value (e.g., 0 in the current example) represent anomalous activity. The higher precision score may be used to determine the anomalous hidden state. For example, if the precision data 230 that takes "1" as the anomalous hidden state is 0.454545, but the precision data 230 that takes "0" as the anomalous hidden state is 0.57, then 0 may be used as the anomalous hidden state for the HMM 208.

Although a precision score (e.g., precision data 230) is described in the foregoing examples, a Euclidean distance (or cosine similarity) between the hidden state vector 216 and the account timing vector 218 may instead be used to determine anomalous computer activity by the account. In various examples, the average of the precision data 230 (e.g., an average precision score) generated by each HMM 208 of the ensemble of HMMs 208 may be used to determine the final precision data 230.

In various examples, if the ensemble precision data 230 exceeds a threshold value (e.g., a threshold precision score), a remedial action may be taken. In various examples, the network access may be temporarily (or permanently) disabled for the account while the activity is investigated for potential fraud. In other examples, a privileged level and/or level of access associated with the account may be modified. In various examples, the account may be flagged and another system may be triggered to determine whether the account is participating in an attack on the network and/or fraudulent activity.

FIG. 2B is a block diagram illustrating detection of anomalous computer activity using sequence-based detection system 202, in accordance with various embodiments of the present disclosure. As previously described, in various examples, the transition probability matrices 212 may be stored in association with account identifier data. In various examples, anomalous computer activity may be investigated using sequence-based detection system 202 irrespective of whether the anomalous activity occurs during atypical computer activity hours for the account.

For example, for a given account being evaluated, the sequence-based detection system 202 may retrieve the transition probability matrix 212 (corresponding to the anomalous activity hidden state) and may simulate a number N (e.g., N=1000, 2000, 500, 12,000, etc.) of actions using the probabilities in the transition probability matrix 212 to generate the Markov chain 232.

In addition, Markov chains may be generated for various other accounts, including accounts associated with known attacks/fraudulent activity, by retrieving the respective transition probability matrices 212 for these other accounts and simulating a number of actions. Thereafter, the activity vector for the account under evaluation may be compared, in the vector space, to various other accounts to determine if there is a similarity (and, if so, to what degree) between the actions of the subject account and those of known attacks/fraudulent activity.

For example, the Euclidean distance and/or cosine similarity may be determined between the subject account activity vector (e.g., Markov chain 232) and the activity vectors associated with different accounts (including those associated with known fraud/known attacks). If the Euclidean distance is less than a particular threshold to one or more known attack activity vectors, remedial action may be taken, as described above.

In another example implementation, a nearest neighbor algorithm (e.g., K-nearest neighbors (KNN)) may be used to determine the K most similar activity vectors in the vector space (e.g., nearest neighbors 234). Thereafter, the number of the nearest neighbors 234 associated with known fraudulent/attack activity may be determined (e.g., block 236) (a subset of the nearest neighbors 234). In some examples, the average distance between the subject activity vector and the activity vectors associated with known fraudulent/attack activity may be determined. If the number of known nearest neighbors 234 associated with known fraudulent/attack activity (e.g., members of the subset of nearest neighbors 234 associated with known anomalous computer activity) exceeds a threshold and/or the average distance between the subject activity vector and the activity vectors associated with known fraudulent/attack activity is below a certain threshold, remedial action may be taken.

Figure 3:
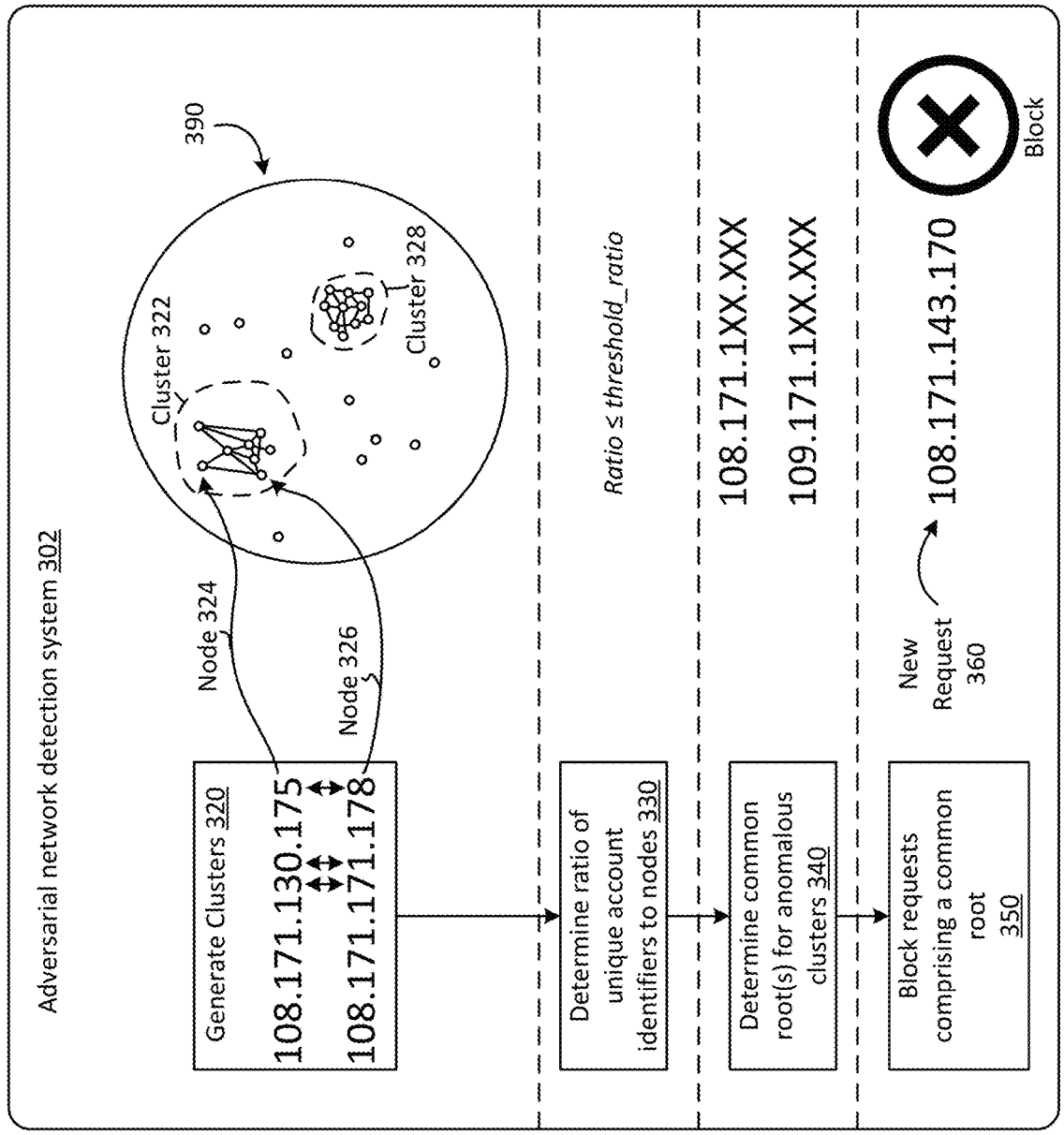
FIG. 3 is a block diagram illustrating detection of an adversarial network using an adversarial network detection system, in accordance with various aspects of the present disclosure.

FIG. 3 is a block diagram illustrating detection of an adversarial network using an adversarial network detection system 302, in accordance with various aspects of the present disclosure. In various examples, the adversarial network detection system 302 may provide gradient-based data indicating anomalous networks used by a particular account. In some examples, the adversarial network detection system 302 may provide data as an input to the aggregated anomalous computer activity detection system 102 of FIG. 1. The gradient-based data may be used to enrich a linear detection, in accordance with various aspects of the current disclosure.

Perpetrators of transactional fraud and other cyber-attacks continually attempt to modify their behavior and/or the characteristics of their attacks and/or fraudulent transactions in order to avoid detection by automated filters and/or machine learning models used to distinguish between potentially fraudulent transactions and non-fraudulent transactions. As a result, technologies are continuously developed by fraud prevention and cyber-security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies, and vice versa.

In various examples, attackers modify network identifiers in order to mask the identity of the attacker and/or to make the attacks appear as though they are legitimate service requests. For example, attackers may modify phone numbers, internet protocol (IP) addresses, geo-location data, and/or other hierarchical data representations associated with attacks and/or fraudulent transactions in order to cyber attack prevention measures.

In an example of such attacks, some online services provide a "click to call" service (or other call-back service) whereby users can provide a telephone number and may request a call from the online service (e.g., for technical support) using a graphical user interface provided by the online service. However, perpetrators of fraud (sometimes referred to as "fraudsters") have set up premium phone numbers that charge the online service a fee every time the phone number is called. The fraudsters may set up automated systems whereby they make a large volume of click-to-call requests causing the click-to-call service to call premium phone numbers in order to defraud the company providing the click to call service. In order to avoid fraud detection filters, the IP addresses used to make such requests and/or the premium phone numbers themselves may be modified over time such that it appears as though different IP addresses and/or phone numbers are being used, when in reality the IP addresses and/or phone numbers are part of the same fraudulent scheme.

However, it has been observed that such modification of IP addresses and phone numbers (and more generally modification of any hierarchical data representations) to avoid detection typically preserves large proportions of the original sequence—typically modifying only a few numbers. Accordingly, accounts that are associated with large IP/phone number pools generally have several clusters with very similar sequences. Traditional means of determining similarity in a feature space often include determining a Euclidean and/or cosine distance between data points. However, Euclidean distance determination is extremely sensitive to the position of a changing value within numbers. For example, the Euclidean difference between the numbers 1,000 and 1,001 is relatively small, but the Euclidean difference between the numbers 9,000 and 1,000 is much larger, despite only a single digit being changed in each of the two examples.

Accordingly, in various examples described herein, hierarchical data representations (such as phone numbers, IP addresses, geolocation coordinates, etc.) may be treated as strings and a distance between any two strings may be represented by the number of "edits" or "substitutions" between the two strings. For example, the strings "Brendan" and "Brandon" may be 2 edits apart and the phone numbers (555) 555-6161 and (555) 555-6999 may be 3 edits apart. Determining the number of edits or substitutions between two strings in this way is sometimes referred to as determining the Levenshtein distance between two strings/numbers.

In various examples described herein, clusters of requests with hierarchical data representations (e.g., IP addresses, phone numbers, etc.) that are similar to one another (as determined by Levenshtein distance) and that are received within a predetermined amount of time (e.g., 5 minutes, 10 minutes, or some other suitable time period) may be determined. In various examples, such clusters of requests may be designated as anomalous (e.g., potentially malicious) if the ratio of the number of unique accounts (e.g., unique user accounts) associated with the requests to the number of requests in the cluster is less than a threshold ratio (e.g., 0.85, 0.9, or some other threshold ratio). Typically, valid requests made during a relatively short time period tend to have a 1-to-1 correspondence between the number of unique user accounts making the request and the total number of requests in a given cluster. Accordingly, if the ratio is significantly less than 1.0 there is a higher likelihood that the cluster of requests are related to an attack.

During the relevant time period, nodes (e.g., each node representing a phone number, IP address, or other hierarchical data representation) are connected and/or otherwise conceptually grouped into a cluster if the number of value substitutions (e.g., the Levenshtein distance) is less than or equal to a threshold value. Thereafter, the ratio of the number of unique accounts to the number of nodes of the cluster (e.g., the connected nodes) is determined and is compared to a threshold ratio. The cluster is denoted as anomalous if the ratio is less than the threshold ratio. The common root(s) of the hierarchical data structures of nodes in a cluster denoted as anomalous is determined. The common root(s) may be the ordered values in the hierarchical data representations that are shared among the nodes of the anomalous cluster. For example, a subset of IP addresses associated with an anomalous cluster may have the same values for the first 3 octets of the IP addresses (e.g., all nodes may be 192.141.8.XXX). Thereafter, any new requests that are received with IP addresses that match this common root may be prevented from accessing the requested service, as such IP addresses may be associated with the adversarial network represented by the anomalous cluster. In some examples, the IP addresses may be blocked for a specified period of time in order to avoid blocking legitimate service requests. For example, an IP address may be blocked by preventing and/or denying access by the IP address to the requested service. Similarly, in some examples, anomalous clusters may be defined for a particular period of time to avoid static definitions of adversarial networks. Further, as described in further detail below, various techniques may be implemented to avoid and/or limit the number of false positives (e.g., the blocking of a legitimate request). Blocked nodes (e.g., blocked IP addresses, phone numbers, etc.) may be added to a list of IP addresses that may be prevented from accessing the particular service for a limited period of time (e.g., 30 minutes, 1 hour, 1 day, etc.).

In various examples, IP addresses/phone numbers/etc. on a blocked list may be monitored to determine if any of the blocked addresses are associated with a false positive. For example, if a particular IP address attempts to access the service through a different channel (e.g., email as opposed to a call-back service) the blocking of the IP address may be determined to be a false positive. In an example, if the number of false positives on the blocked list is above a certain percentage, an alert may be triggered and the blocked list may be evaluated by a human evaluator. In another example, a false positive that is incorrectly blocked from accessing a service may be granted access to the service after the blocked list expires (e.g., after 30 minutes, etc.). However, a blocked list's tenure may be renewed, extending the expiration time, if the potentially adversarial address(es) continually attempt to request the service.

In various examples, the adversarial network detection system 302 may receive a plurality of requests. The requests may be requests to access a compute service, a click-to-call service, online purchase requests, online support requests, and/or any type of request that may be made over a communications network. In various examples, adversarial network detection system 302 may receive the requests and may determine hierarchical data representations associated with each request. The hierarchical data representations may be any hierarchical representation of data, such as telephone numbers, IP addresses, geolocation coordinates, etc. Hierarchical data representations represent some hierarchy of data. For example, in an IP address, the first sequence of bits (e.g., the first octet in IPV4) may represent a network, while the final bits (e.g., of the final, right-most octet) may represent an individual node. In some examples, the middle two octets of an IP address may represent sub-networks, for easier request routing. Similarly, in phone numbers, the first digits (e.g., the left-most digits) typically represent the highest category of geographic locations (e.g., country codes), while the next level of digits may represent an area code. In some examples, the following digits may represent a city and/or a portion of a city, etc.

As requests for the relevant service are received, adversarial network detection system 302 may determine the positions of the nodes (with each node being represented by its corresponding hierarchical data representation) within a feature space 390. In various examples, adversarial network detection system 302 may generate clusters (action 320) of nodes over time periods. The time periods may be parameters that are pre-selected and/or that are determined based on, for example, a rate at which requests are being received.

In the example depicted in FIG. 3, a first request may be received from the IP address 108.171.130.175. The first request may be represented as node 324 in feature space 390. Similarly, a second request may be received from the IP address 108.171.171.178. The second request may be represented as node 326 in feature space 390. Adversarial network detection system 302 may determine the number of value substitutions/differences/additions/deletions between the first request and the second request (e.g., between nodes 324 and 326). As indicated by the double-headed arrows in FIG. 3, there are 3 value substitutions between the IP address of the first request and the IP address of the second request (e.g., a Levenshtein distance of 3). The number of value substitutions/differences (e.g., the Levenshtein distance) may be compared to a threshold value. The threshold value may be a tunable parameter that may be manually selected and/or determined based on data representing a corpus of nodes (e.g., based on training data used to train a machine learning model that outputs an appropriate threshold value based on current and/or historical conditions). In an example, the threshold number of value substitutions may be 4. If two nodes (e.g., two hierarchical data representations) have a distance that is less than or equal to the threshold number, the nodes may be connected (e.g., clustered together) by adversarial network detection system 302.

In the current example, there are three substitutions between the IP address of node 324 and the IP address of node 326. Accordingly, the number of substitutions is less than the threshold and the nodes are clustered together into cluster 322. In the example depicted in FIG. 3 a plurality of other nodes are clustered together in cluster 328. In an example, two nodes are connected in the cluster if the number of value substitutions between the two nodes is less than or equal to (or simply less than in other embodiments) the threshold number.

Adversarial network detection system 302 may determine, for each cluster, a ratio of the number of unique account identifiers (and/or unique user identifiers) to the number of nodes (action 330). For example, adversarial network detection system 302 may determine the account identifier associated with each node of cluster 322. Account identifiers (or other identifying data) may be provided as metadata along with the service request (e.g., as a result of a user logging in prior to requesting the service). In various examples, requests that are not associated with any account identifiers (or other identifying data) may be considered as emanating from a single entity. The ratio of unique account identifiers to the number of requests/nodes in a cluster may be compared to a threshold ratio. If the ratio is less than the threshold ratio (or less than or equal to depending on the implementation), the cluster may be marked as anomalous for purposes of further processing/attack prevention. In various examples, to avoid unnecessarily blocking legitimate requests, adversarial network detection system 302 may only designate clusters as anomalous when greater than or equal to a threshold number of connected nodes/requests are determined during a particular time period. For example, a cluster may be denoted as anomalous only where greater than or equal to 10 (or any other suitable number) requests have been received within the past 3 minutes.

For example, there may be 20 nodes in cluster 322 (representing 20 separate requests for a service). Among the 20 nodes, 10 may be associated with a single account identifier and 5 may not be associated with any account identifier. Each of the remaining 5 nodes may be associated with their own, respective account identifiers. Accordingly, in the current example the ratio=(1+1+5)/20=7/20=0.35. In the current example, the threshold ratio may be 0.65 (although any suitable value may be used). Since the calculated ratio is less than the threshold ratio, cluster 322 may be designated as anomalous. In various examples, the ratio determined at action 330 may be an example of gradient-based detection enrichment data 122 that may be provided as an input to the aggregated anomalous computer activity detection system 102. For example, the ratio may be used as some indication that networks associated with a particular account may be adversarial in nature.

Adversarial network detection system 302 may determine the common root(s) for anomalous clusters (action 340). In various examples, upon designation of a cluster as anomalous, adversarial network detection system 302 may determine the common root(s) among the hierarchical data representations associated with that cluster. Each IP address includes a set of ordered numbers (e.g., 4 octets). The common root may be the set of ordered numbers common to a subset of nodes of the anomalous clusters (or to all nodes of the anomalous cluster). For example, all the IP addresses associated with at least some nodes of cluster 322 may include the same values for the first 2 octets—108 and 171, respectively. Similarly, the third octet, when expressed in decimal notation, may have three digits and all nodes may have a 1 as the first digit, although the remaining two digits may differ among the different nodes. Accordingly, in decimal form, the common root for cluster 322 may be 108.171.1XX.XXX with the Xs representing variable, generic values. Although in the foregoing example, the common root comprises only contiguous values within the decimal representation of the IP addresses, in at least some examples, the common values need not be contiguous. In some examples, data at higher hierarchical levels representing more general data (e.g., the first octet and/or first two octets of an IP address and/or the area code of a telephone number) may be disregarded for purposes of determining the common root(s). For example, there may be a single substitution between the IP address 108.171.130.175 and the IP address 109.171.130.175. However, since this substitution occurs in the first octet (e.g., replacing the "8" with the "9"), this substitution may be ignored. In the example, the common roots for this example cluster may be determined to be any IP address beginning with 108.171.XXX.XXX or 109.171.XXX.XXX, as the first two octets may be disregarded.

Adversarial network detection system 302 may thereafter block incoming requests (e.g., prevent access to one or more services) associated with the common root (action 350). For example, new request 360 may be from IP address 108.171.143.170 that includes the common root 108.171.1XX.XXX determined at action 140. Accordingly, the new request 360 may be blocked. In various examples, to avoid blocking legitimate requests, requests may be blocked only if they are received within a threshold amount of time from designation of a cluster as anonymous. In some other examples, incoming requests may be blocked if they are a threshold distance (e.g., Levenshtein distance) from any of the common roots.

Figure 4A:
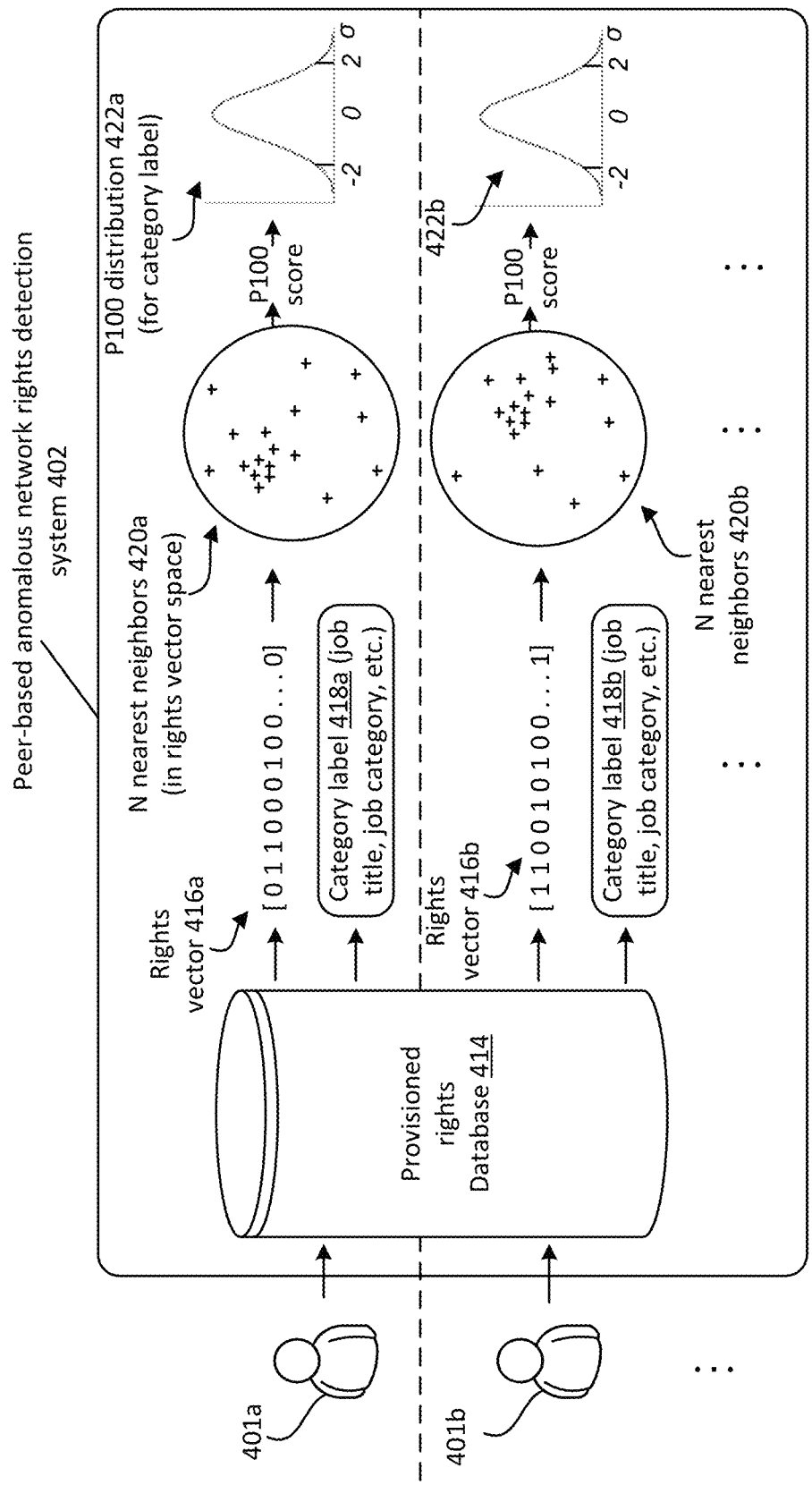
FIG. 4A is a block diagram illustrating a peer-based anomalous network rights detection system, according to various aspects of the present disclosure.

FIG. 4A is a block diagram illustrating a peer-based anomalous network rights detection system 402, according to various aspects of the present disclosure. In various examples, the peer-based anomalous network rights detection system 402 may provide gradient-based data indicating a P100 distribution indicating anomalous rights for a particular account. In some examples, the peer-based anomalous network rights detection system 402 may provide data as an input to the aggregated anomalous computer activity detection system 102 of FIG. 1. The gradient-based data may be used to enrich a linear detection, in accordance with various aspects of the current disclosure.

The peer-based anomalous network rights detection system 402 may be used for anomaly detection. Specifically, peer-based anomalous network rights detection system 402 may determine whether an individual account has acquired anomalous network rights (e.g., network access rights held by an account that the account should not have or does not need) relative to their peer accounts. In this context, "peers" refers to other accounts with similar job categories, job families, job titles, etc.

In various examples, each account may be associated with a network rights array (e.g., a rights vector) that defines the network rights of that account. In various examples, each element of the network rights vector (or array) may correspond to a particular network right, while the value of each element may indicate whether or not the network right is a permissive network action for the account. In an example implementation, the network rights vector may comprise binary values with a 0 indicating that the account does not have the associated network right, and a 1 indicating that the account has the associated right. However, other implementations (e.g., non-binary implementations) are possible in accordance with the desired use case. As used herein, "rights" refer to a permission and/or level of access that is enforced by a computer and/or a computer-system that permits or prohibits (depending on presence or absence of the right) an account from taking a defined computing action, operation, and/or access to a controlled area and/or controlled information. In various examples, individual accounts may be designated with "roles" that may include a specified set of rights. Accordingly, in at least some cases, a role may be associated with a particular rights vector that describes the particular rights associated with the role.

In various examples, there may be a large number of rights (e.g., hundreds, thousands, tens of thousands, etc.) at an organizational and/or network level. Additionally, large organizations may have a large number of accounts at different hierarchical levels, making comparison of individual accounts' rights vectors a non-trivial task. In some examples described herein, for each account, a nearest neighbor algorithm may be executed to determine the top N nearest neighbors for each employee in the rights space. For example, a nearest neighbor algorithm may be used to determine the 100 closest accounts (N=100) in terms of rights held by the subject account. In some cases, because of the large dimensionality and size of the data, an approximate nearest neighbor algorithm may be advantageous. For example, Approximate Nearest Neighbors Oh Yeah (AN-NOY) may be used to drastically reduce compute time. ANNOY subdivides n-dimensional space by inserting random hyperplanes through the data that subdivide the search space.

Upon determining the nearest neighbors in the rights space for a subject account, a determination may be made of the number of the nearest neighbors that have the same predefined category or categories as the subject account. In various examples, each job or position may be associated with various category descriptor labels. For example, the subject account may have the category label "Systems Engineer 2." A determination may be made of how many of the N nearest neighbors in the rights space are associated with the category label "Systems Engineer 2." In various examples, where N=100 the number of the 100 nearest neighbors in the rights space having the matching predefined category label may be referred to as a P-100 score. More generally, the number of the N nearest neighbors in the rights space having the matching predefined category label may be referred to as a "score" or "P score" for the subject. Generally, having a lower score indicates that the subject has an anomalous rights profile among other accounts associated with the same predefined category.

In many examples herein, the P scores are referred to as "P100 scores." Although, as previously described any value for N in the nearest neighbor algorithm (or approximate nearest neighbor algorithm) may be used. Accordingly, although often referred to as P100 scores, the score may reflect the number of matching category labels among a set of accounts of any size (output by the nearest neighbor algorithm). In various examples, a distribution of the P scores for each category label of interest may be determined and a Z-score may be computed for each individual.

A Z-score (sometimes referred to as a "standard score") is given by:

$$Z = \frac{x - \mu}{\sigma}$$

where x is the observed value (the P score of the subject account), u is the mean of the sample, and $\sigma$ is the standard deviation of the sample. An individual with a Z-score above (or below) a certain threshold indicates that the individual has anomalous rights with respect to their peer accounts. In various examples, Z-scores may be calculated for different regions and/or markets (e.g., North America, Asia, etc.). In various examples, other techniques may be used to determine that an individual account has anomalous rights with respect to their peer accounts. For example, a mean P score $\mu$ of individual accounts having the same category label as the individual may be determined. A residual value may be determined for the account being evaluated (e.g., x−μ). The magnitude of the residual value may be used to determine whether the subject account has anomalous rights with respect to their peer accounts.

Because an account can be anomalous because of a lack of rights and due to an over-abundance of anomalous rights, a representative "segment vector" may be calculated to pull out over-provisioned users and determine which rights are particularly anomalous. For example, for each category label (e.g., job family, job title, department, and/or any other desired category descriptor) a representative segment vector of rights may be determined. The segment vector may be a rights vector that takes the average of all values of all accounts having the relevant category label (e.g., an average vector for all rights values for the category label). In the case where the rights vectors are binary, the segment vector will have values between 0-1. Accordingly, the segment vector measures the relative propensity of each category to have or not have each right. Each account's right vector may be subtracted from the segment vector and rights with less than a 1/10 chance of appearing given the account category may be flagged for potential investigation. For example, the segment vector may be used to determine that less than a threshold percentage of accounts with a relevant category label have a particular right.

As different rights may be provisioned over time, the various techniques described herein may be repeated over time (e.g., on a daily basis, weekly basis, etc.) to capture longitudinal anomalies from sudden over-provisioning of rights alongside over-provisioning stemming from a past event (e.g., where an account-holder changes job titles/responsibilities and acquires new rights stemming from the change while keeping rights from the previous role).

The various systems and techniques described herein may be used in a variety of applications. For example, the techniques may be used to generate a baseline "standard" permission structures for job types. This may be particularly useful for cases where a large body of accounts have potential access to sensitive data. The P score (e.g., P100) metric is inherently robust to perturbation (from organizational changes, policy changes, job requirement changes, etc.) as it detects anomalies relative to other peers rather than a hard-coded standard. Additionally, when an individual account has acquired anomalous rights, it can be determined which job category that account most closely resembles (based on their rights) from their nearest neighbors (e.g., similar rights holders, such as rights holders having one or more common rights to the individual being evaluated). For example, the predominant category label (e.g., the category label associated with the most accounts among the N nearest neighbors) may be the category label that the subject account most closely resembles (in terms of provisioned rights) whether or not the subject account has that same predominant category label. Additionally, in some cases, the various systems and techniques described herein may be used to determine that a number of accounts with anomalous rights may report to the same individual. This can be flagged for investigation—even where the common supervisory account does not have an anomalous rights profile.

Accounts 401a, 401b, etc., may be individual accounts associated with an institution. Each of the accounts 401a, 401b may be associated with a respective rights vector 416a, 416b that represents the rights of that account. In the example depicted in FIG. 4A, the rights vectors for each account are stored in provisioned rights database 414. However, provisioned rights database 414 may be a separate component from the peer-based anomalous rights detection system 402 in various embodiments. For example, when peer-based anomalous rights detection system 402 is implemented as a service, the rights vectors 416a, 416b, etc., may be provided by the institution/system using the peer-based anomalous rights detection system 402 (e.g., over network 104).

In addition to the rights vector 416a, 416b, each account 401a, 401b, etc., may be associated with one or more category labels 418a, 418b, etc. The category labels 418a, 418b may describe various categories associated with the accounts 401a, 401b. For example, category labels 418a, 418b may include job titles, job categories, job families, roles, responsibilities, etc. The specific category labels used may vary according to the desired implementation. Category labels 418a, 418b may be stored in provisioned rights database 414 and/or at some other location and may be accessible by peer-based anomalous rights detection system 402.

As depicted in FIG. 4A, peer-based anomalous rights detection system 402 may execute an N nearest neighbors algorithm to determine N nearest neighbors 420a, 420b, etc. The N nearest neighbors 420a, 420b represent the N most similar rights vectors in the rights space. For example, N nearest neighbors 420a represent the N most similar rights vectors to rights vector 416a for account 401a. Similarly, N nearest neighbors 420b represent the N most similar rights vectors to rights vector 416b for account 401b. Each of the rights vectors of the N nearest neighbors 420a, 420b are associated with a particular account. These accounts are, in turn, associated with category labels (e.g., job titles, job categories, etc.).

A P100 score may be determined for account 401a by determining the number of accounts of the N nearest neighbors 420a that have the same category label as category label 418a. Similarly, a P100 score may be determined for account 401b by determining the number of accounts of the N nearest neighbors 420b that have the same category label as category label 418b.

P100 scores (or, more generally, P scores) may be determined for each account of interest (e.g., for each employee of an institution). The peer-based anomalous rights detection system 402 may determine a distribution of P100 scores for each account having the same category label as the subject account. Note that this may be performed for multiple different category labels. For example, P100 distribution 422a may be a distribution of P100 scores for accounts having the same category label as account 401a (e.g., having a category label identical to category label 418a). Similarly, P100 distribution 422b may be a distribution of P100 scores for accounts having the same category label as account 401b (e.g., having a category label identical to category label 418b). The distributions may be used to determine how statistically anomalous the account's rights are. For example, Z-score may be determined for each distribution. Accounts with large Z-scores may be anomalous with respect to other accounts having the same category label. In various examples, after a particular linear detection (e.g., a linear detection related to data exfiltration), the rights vector of the account may be included in a data generated by the aggregated anomalous computer activity detection system 102. In various examples, the P100 score and/or the Z-score for the particular account may be determined as gradient-based data input into the aggregated anomalous computer activity detection system 102 as enrichment data. Such data may be used to triage, sort, and/or perform an automated action (e.g., disabling network access for the particular account, modifying the rights vector of the account, etc.).

Figure 4B:
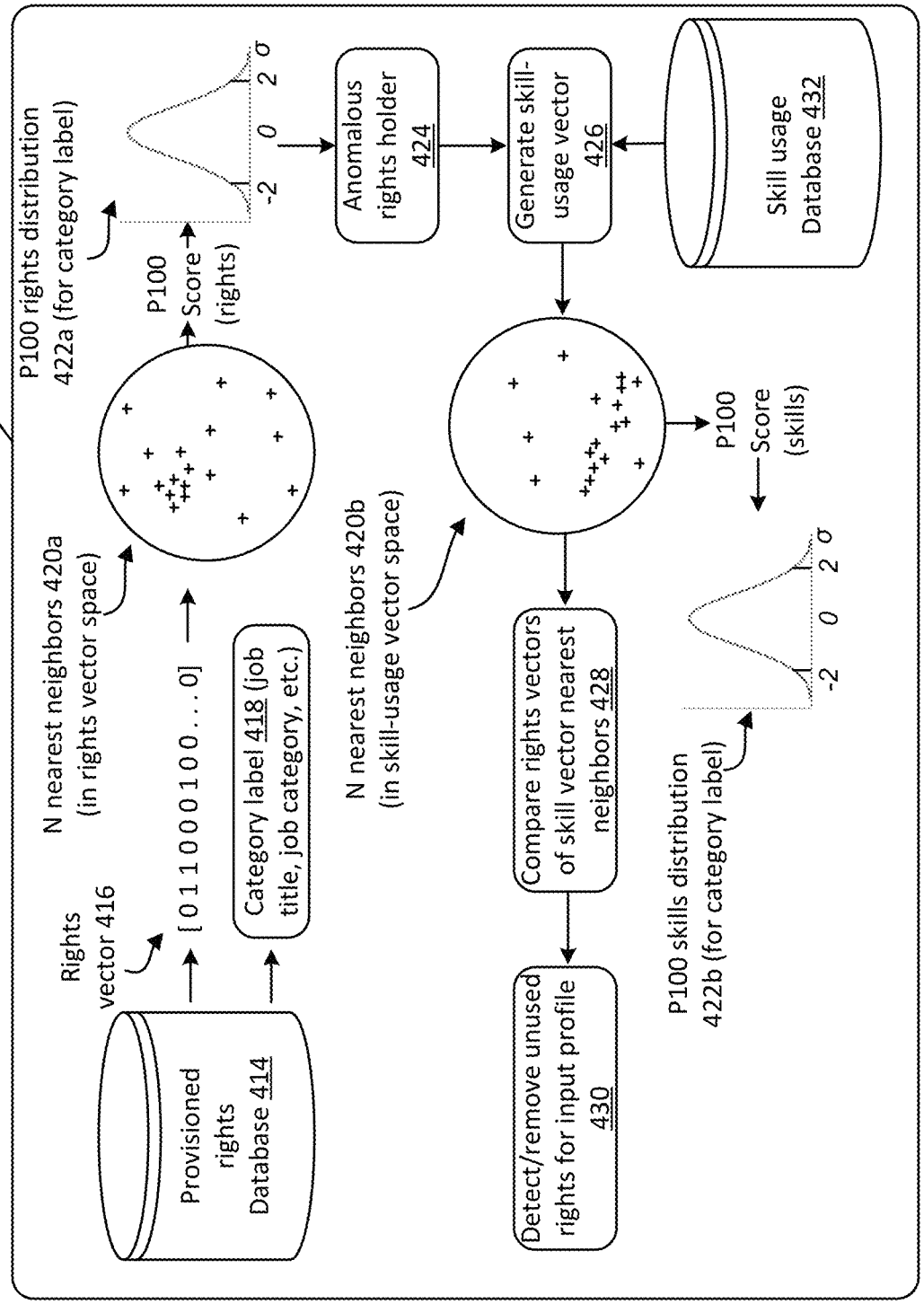
FIG. 4B is a block diagram illustrating a peer-based unused rights detection system, according to various aspects of the present disclosure.

FIG. 4B is a block diagram illustrating a peer-based unused rights detection system 452, according to various aspects of the present disclosure. In various examples, the peer-based unused rights detection system 452 may provide gradient-based data indicating a P100 distribution indicating anomalous rights for a particular account. In some examples, the peer-based unused rights detection system 402 may provide data as an input to the aggregated anomalous computer activity detection system 102 of FIG. 1. The gradient-based data may be used to enrich a linear detection, in accordance with various aspects of the current disclosure.

The peer-based unusued rights detection system 452 depicted in FIG. 4B is able to perform various different techniques. In some cases, the techniques may be combined, as is shown in the example. However, the techniques may also be used separately. For example, the peer-based unusued rights detection system 452 shown in FIG. 4B may be effective to detect profiles (e.g., account profiles) having anomalous rights (e.g., an anomalous rights holder 424), profiles exhibiting anomalous skill-usage data, and may also detect and/or remove unused rights for a given input profile (block 430).

Accounts associated with an institution (such as an employer) may be associated with a respective rights vector 416 that represents the rights of that account. In the example depicted in FIG. 4B, the rights vectors for each account may be stored in provisioned rights database 414. However, provisioned rights database 414 may be a separate component from the peer-based unusued rights detection system 452 in various embodiments. For example, when peer-based unusued rights detection system 452 is implemented as a service, the rights vectors 416 and/or skill vectors stored in skill-usage database 432, etc., may be provided by the institution/system using the peer-based unused rights detection system 452 (e.g., over network 104).

In addition to the rights vector 416 a profile representing each account may be associated with one or more category labels 418. The category labels 418 may describe various categories associated with the accounts. For example, category labels 418 may include job titles, job categories, job families, roles, responsibilities, etc. The specific category labels used may vary according to the desired implementation. Category labels 418 may be stored in provisioned rights database 414 and/or at some other location and may be accessible by peer-based unusued rights detection system 452.

As depicted in FIG. 4B, peer-based unusued rights detection system 452 may execute an N nearest neighbors algorithm in the rights vector space (e.g., a feature space of the rights vector 416) to determine N nearest neighbors 420a. The N nearest neighbors 420a represent the N most similar rights vectors in the rights space. For example, N nearest neighbors 420a represents the N most similar rights vectors to rights vector 416 for input profile data. Each of the rights vectors of the N nearest neighbors 420a are associated with a particular account. These accounts are, in turn, associated with category labels (e.g., job titles, job categories, etc.). The nearest neighbor algorithm may be a clustering algorithm and/or any other nearest neighbor algorithm (e.g., K-means clustering, K-nearest neighbors (KNN), etc.).

A P100 score may be determined in the rights space for a subject profile by determining the number of accounts of the N nearest neighbors 420a that have the same category label as category label 418. P100 scores (or, more generally, P scores) may be determined for each account of interest (e.g., for each employee of an institution). The peer-based unusued rights detection system 452 may determine a distribution of P100 scores for each account having the same category label as the subject account. Note that this may be performed for multiple different category labels. For example, P100 distribution 422a may be a distribution of P100 scores for accounts having the same category label as account 401a (e.g., having a category label identical to category label 418a). The distribution may be used to determine how statistically anomalous the account's rights are. For example, Z-score may be determined for each distribution. Accounts with large Z-scores may have anomalous rights with respect to other accounts having the same category label.

In the example of FIG. 4B, an anomalous rights holder 424 may be determined to have anomalous rights based on their Z-score and/or P score. Accordingly, this account may be subject to further analysis to determine any unused rights. A skill-usage vector 426 may be determined for the subject account determined to have anomalous rights (e.g., anomalous rights holder 424). The skill-usage vector 426 may include an element for each skill associated with the organization. Each element of the skill-usage vector may include either a binary or a non-negative integer value (depending on the desired implementation). In the binary implementation, one value (e.g., a "1") may represent that the account has used the relevant skill over the past time period of interest, while the other value (e.g., a "0") may represent that the account has not used the relevant skill over the past time period of interest. In the non-negative integer case, the value for each element may represent the number of times that the account has invoked the skill over the past time period of interest. Skill-usage database 432 may include data indicating use of each skill along with relevant timestamp information and/or partitioned per time period.

Upon determining a skill-usage vector for the anomalous rights holder 424 (and for all other accounts of interest), peer-based unusued rights detection system 452 may execute an N nearest neighbors algorithm in the skill-usage vector space (e.g., a feature space of the skill-usage vector 426) to determine N nearest neighbors 420a in the skill-usage vector space over the relevant time period. The N nearest neighbors 420a represent the N most similar accounts in terms of skill-usage over the relevant time period to the subject account (e.g., anomalous rights holder 424). For example, N nearest neighbors 420a represents the N most similar skill-usage vectors to skill-usage vector 426 for anomalous rights holder 424. Each of the rights skill-usage vectors of the N nearest neighbors 420a are associated with a particular profile. These profiles are, in turn, associated with category labels (e.g., job titles, job categories, etc.).

A P100 score may be determined in the skills space for a subject profile in the same way as described above in the rights space by determining the number of accounts of the N nearest neighbors 420a that have the same category label as category label 418.

P100 scores (or, more generally, P scores) may be determined for each account of interest (e.g., for each employee of an institution) in the skill space for a given category label. The peer-based unusued rights detection system 452 may determine a distribution of P100 scores for each account having the same category label as the subject account. Note that this may be performed for multiple different category labels. For example, P100 distribution 422a may be a distribution of P100 scores for accounts having the same category label as the anomalous rights holder 124 (e.g., having a category label identical to category label 118). The distributions may be used to determine how statistically anomalous the account's rights are. For example, Z-score may be determined for each distribution. Accounts with large Z-scores may exhibit anomalous skill-usage over the relevant time period with respect to other accounts having the same category label. Various remedial actions and/or alerts may be generated based on anomalous skill-usage (similar to anomalous rights provisioning).

In addition to determining anonymous skill-usage and/or anonymous rights provisioning, peer-based unusued rights detection system 452 may be used to detect unused rights of profiles. For example, upon determining the N nearest neighbors 420b in the skill-usage vector space, the rights vectors of these N nearest neighbors 420b may be determined. The rights vectors of the skill-usage vector nearest neighbors may be compared to the rights vector of the subject (e.g., anomalous rights holder 424) to determine significant difference in the rights vectors 416 (block 428). For example, the rights vectors 416 of the N nearest neighbors 420b (e.g., "skill-usage neighbors") can be determined and compared to the subject's rights vector 416. The comparison at block 428 may include normalizing the presence of the skill-usage neighbor's rights between 0 and 1 (0 if none of the n neighbors have the right, 1 if all do) and subtracting from the given employee's rights vector. In various examples, the normalized rights vectors of the skill-usage neighbors may be averaged to determine the average rights vector pertaining to the skill-usage neighbors. The difference between the subject's rights vector 416 and that of their normalized skill-usage neighbors' rights vectors 416 can indicate which rights are most likely not used given the employee and their neighbors are invoking similar sets of skills yet the subject has additional rights (block 430). In various examples, the unused rights may be automatically removed from the input profile data to avoid unnecessary rights provisioning that could lead to potential misuse. Note that P100 scores for rights and/or skills usage may be aggregated for accounts at a group level. For example, all the P100 scores may be aggregated for all account users at a particular work site (e.g., a building) and/or for a particular city, country, or other geographic locale, and/or for a particular role or responsibility. Even if the various outlier detection techniques used for determining anomalous rights and/or skill usage do not indicate that accounts in the group are anomalous, the P100 scores may be used to draw insights about the particular group. For example, it may be determined that the P100 scores for accounts at a particular site are only 1.5 standard deviations from the mean (where +/−2 standard deviations are required to classify an account as anomalous). However, the fact that the accounts at the particular site are somewhat anomalous as compared to other sites may be used to draw the insight that some mechanism and/or practice is causing anomalous rights provisioning and/or skill usage at the particular site. Accordingly, the techniques described herein may be used to determine and/or investigate biases in anomalous rights provisioning and/or skill usage at various levels of aggregation.

In various examples, the P100 scores for rights distribution 422a and/or for the skills distribution 422b (and/or the Z-scores) for the particular account may be determined as gradient-based data input into the aggregated anomalous computer activity detection system 102 as enrichment data. Such data may be used to triage, sort, and/or perform an automated action (e.g., disabling network access for the particular account, modifying the rights vector of the account, etc.).

Figure 4C:
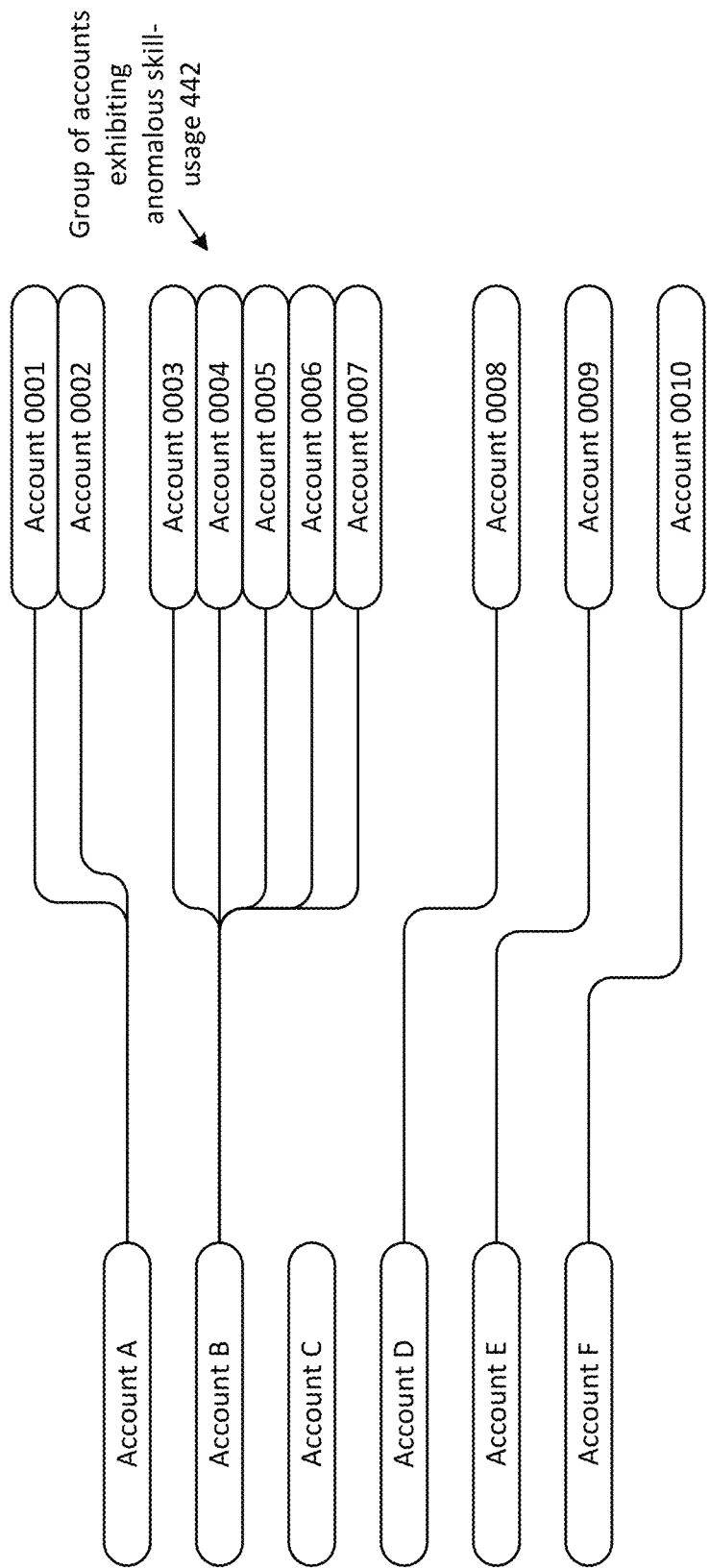
FIG. 4C is a data visualization depicting another example data visualization of a peer-based anomalous skill-usage detection, in accordance with various aspects of the present disclosure.

FIG. 4C is a data visualization depicting another example data visualization of a peer-based anomalous skill-usage detection, in accordance with various aspects of the present disclosure. In examples where the peer-based unused rights detection system 452 is implemented as a service, the data visualization of FIG. 4C may be provided via a graphical user interface. In various examples, after determining that one or more individuals have exhibited anomalous skill-usage (e.g., based on Z-scores and/or changes in Z-scores exceeding a desired threshold), data visualizations may be provided to show hierarchical report chains. Such hierarchical visualizations may show that many individuals exhibiting anomalous skill-usage report directly to the same individual. For example, in FIG. 4C, the accounts 0001-0010 may have been determined to exhibit anomalous skill-usage over the relevant time period. As can be seen, accounts 0003-0007 (e.g., group of accounts exhibiting anomalous skill-usage 442) all report to the same Account B. Accordingly, while Account B may not themselves exhibit anomalous skill-usage, Account B may be flagged for investigation based on possible provisioning of anomalous rights to their direct reports (enabling the anomalous skill-usage 402).

In some cases, it could be that an account's provisioned rights and/or skill-usage is not anomalous; however, the amount and/or rate at which the individual is using one or more skills may be anomalous. For example, an account generating automating code in a browser to use a skill over and over again (e.g., scripting) to gain large scale user data (e.g., for exfiltration). Such skill usage may be anomalous in terms of the amount of times the skill was used over a given time period, even when the skill itself is customarily used during practices of other accounts having the same category label 118 as the subject account. Accordingly, in such examples, a non-binary skill usage vector may be advantageous to reflect anomalies in the amount of skill usage in a given time period.

In various examples, the Account account ID associated with reports displaying anomalous rights profiles (e.g., FIG. 4A) and/or anomalous skills usage (e.g., FIG. 4B) may be included in data generated by the aggregated anomalous computer activity detection system 102 as descriptive data in response to a linear detection. In various examples, the Account associated with an account may only be included when the Z-score of the rights vector and/or skill usage vector exceeds a threshold (e.g., where the account represents a statistical outlier).

Figure 5:
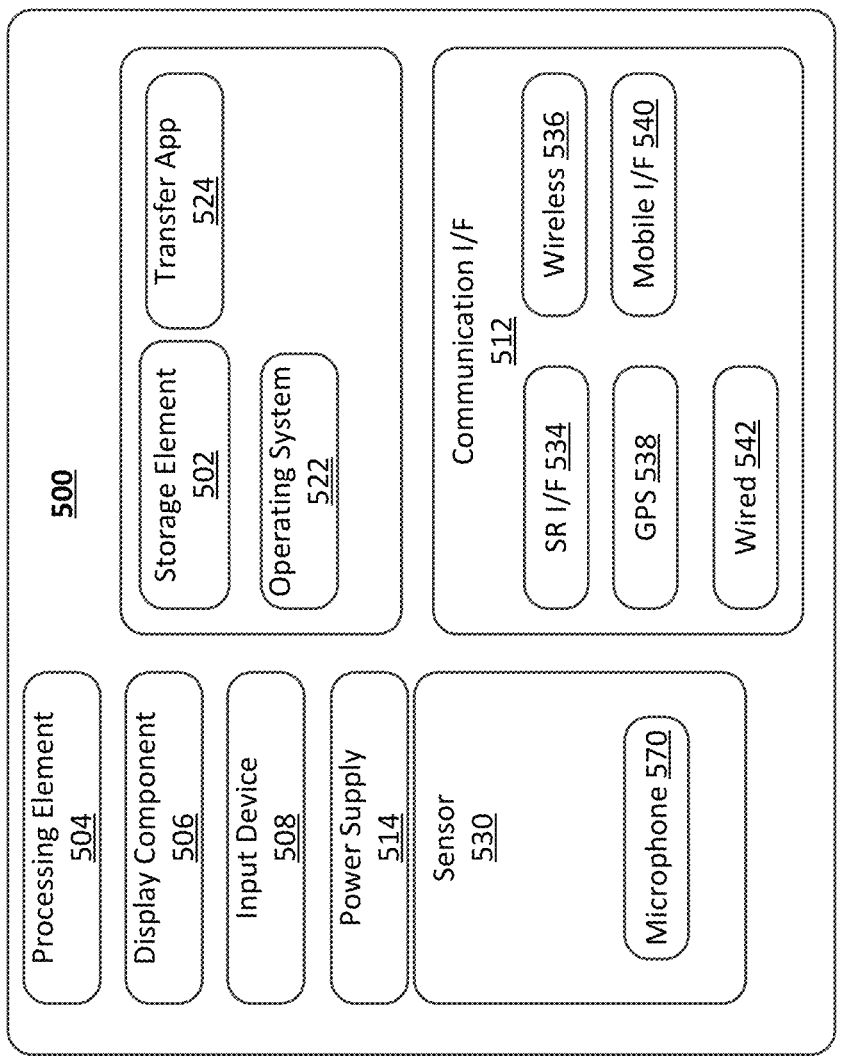
FIG. 5 is a block diagram showing an example architecture of a computing device that may be used in accordance with various embodiments described herein.

FIG. 5 is a block diagram showing an example architecture 500 of a computing device that may be configured to detect and/or prevent anomalous computer activity, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or hierarchical data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
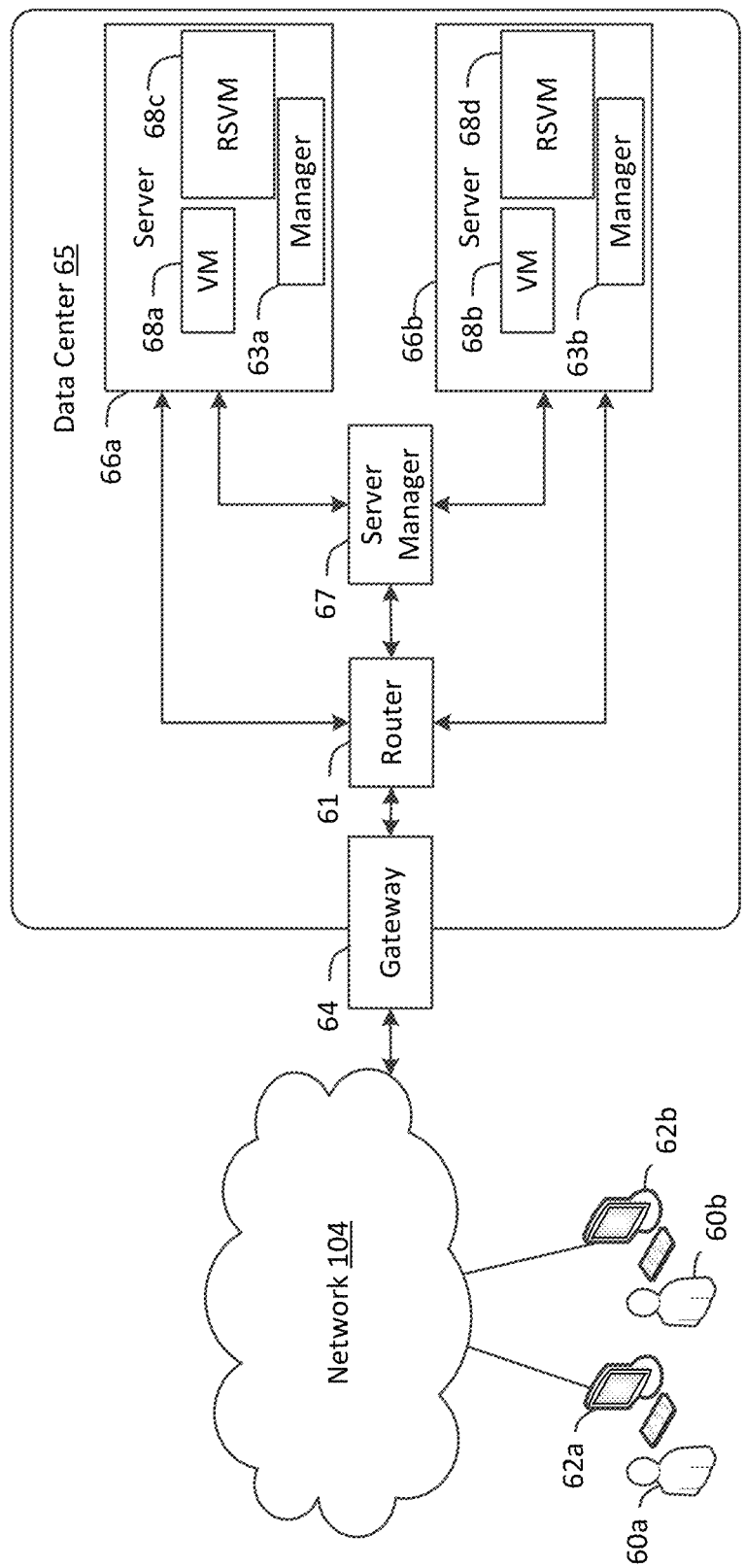
FIG. 6 is a diagram illustrating an example system for sending and providing data that may be used in accordance with the present disclosure.

An example system for sending and providing data and detecting anomalous computer activity will now be described in detail. In particular, FIG. 6 illustrates an example computing environment in which the embodiments described herein may be implemented. For example, the computing environment of FIG. 6 may be configured to provide anomalous computer activity detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various anomalous computer activity detection techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box, or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
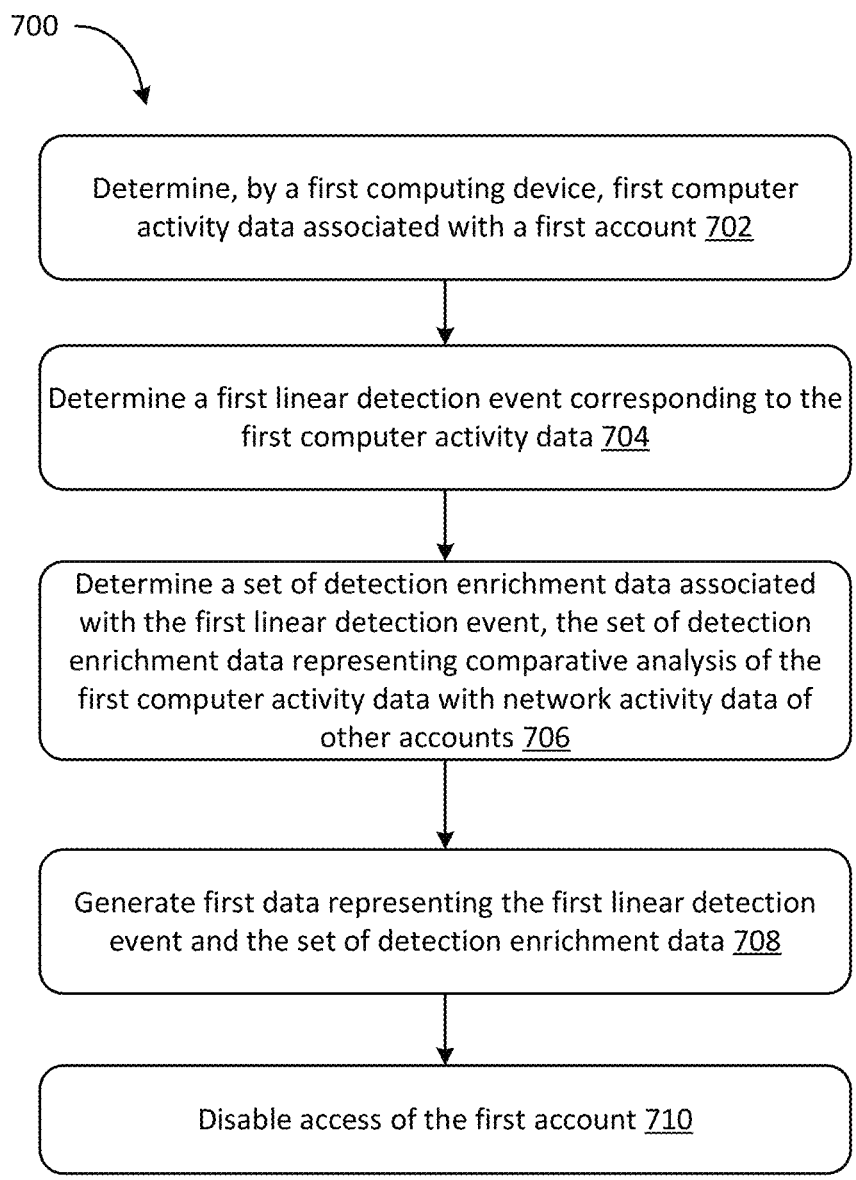
FIG. 7 is a flow diagram illustrating an example process for disabling network access for a first account in accordance with various aspects of the present disclosure.

FIG. 7 depicts a flow chart showing an example process 700 for disabling network access for a first account, in accordance with various aspects of the present disclosure. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6.

Process 700 may begin at action 702, at which a first computing device may determine first computer activity data associated with a first account. For example, application log data, CRUD operations (create, read, update, delete), system calls, and any other computer-based operation (alone, in combination with other events, and/or with attending metadata) may be considered computer activity data. The various actions of the first computer activity data may be time-stamped and may be actions occurring over a past time period.

Processing may continue at action 704, at which a first linear detection event corresponding to the first computer activity data may be determined. The first linear detection event may indicate that some threshold has been violated during a relevant time period. For example, the first computer activity data may indicate that the first account has performed a first action more than a threshold amount of times during a relevant time period in violation of a defined threshold.

Processing may continue at action 706, at which a set of detection enrichment data 122 associated with the first linear detection event may be determined. The set of detection enrichment data may represent comparative analysis of the first computer activity data (or a portion thereof) with computer activity data of other accounts. For example, a particular set of detection enrichment data (detection enrichment data 122) may be associated with the first linear detection event determined at action 704. The detection enrichment data may be a comparative analysis of the first computer activity data with respect to other accounts. For example, if the first linear detection event is sending greater than a threshold amount of data to a URL and/or class of URLs over a first amount of time, detection enrichment data may indicate a Z-score for the first account indicating a standard deviation of an amount of data sent to the URL/class of URLs by the first account relative to other similar accounts. In another example, a standard deviation of skill usage by the first account (determined using peer-based unused rights detection system 452) may be another example of detection enrichment data associated with the first linear detection event. In the current example, let it be assumed that the Z-score indicates that the first account is greater than three standard deviations away from similar accounts in terms of an amount of data sent to the URLs and that the standard deviation of skill usage indicates that the first account is anomalous in terms of skill usage relative to peer accounts.

Processing may continue at action 708, at which first data representing the first linear detection event and the set of detection enrichment data may be determined. In various examples, the first data may represent the linear detection event, the associated detection enrichment data 122, and/or any categorical descriptive data 120 that may be associated with the linear detection event. The first data may be in a machine-readable format so that the first data may be ingested by a system used to determine output action 160 (e.g., network action model 150). In various examples, a correspondence between the first data and one or more past linear detection events may be determined. In various examples, the correspondence may be used to determine that the linear detection event represents unauthorized computer activity. As previously described, the output action 160 may involve routing the first data to a particular analyst system, performing an automated action, generating an alert (e.g., an email alert), etc. The particular action is depending on the desired implementation. Additionally, the network action model 150 may be a rules-based system, a machine learning model, and/or some combination of the two, depending on the desired implementation.

Processing may continue at action 710, at which access (e.g., network access, computer service access, etc.) of the first account may be disabled. In the current example, there may be a rule and/or a predicted outcome for accounts with Z-scores greater than three standard deviations away from similar accounts in terms of an amount of data sent to a particular class of URLs when the first account is associated with anomalous skill usage that is effective to automatically suspend service access for the first account. Accordingly, in the current example, network access privileges of the first account may be modified to disable access.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of detecting anomalous computer activity, the method comprising:
   determining, by a first computing device, a first account associated with first computer activity;
   determining, by the first computing device, a first linear detection event corresponding to the first computer activity;
   determining first descriptive data associated with the first account;
   determining gradient-based data associated with historical computer activity of the first account;
   generating first data representing the first linear detection event, the first descriptive data, and the gradient-based data;
   determining that the first data is associated with a first class of computer activity by comparing the first data to historical data associated with at least one past linear detection event; and
   disabling, by the first computing device, network access for the first account based on the first data being associated with the first class of computer activity.

2. The computer-implemented method of claim 1, further comprising:
   determining, for the first account, second data representing network access rights held by the first account;
   determining, using a first nearest neighbor algorithm and the second data, a set of accounts having one or more rights common to the first account;
   determining a category label associated with the first account;
   determining a number of accounts of the set of accounts having the category label; and
   generating first gradient-based data of the gradient-based data indicating that the rights held by the first account are anomalous.

3. The computer-implemented method of claim 2, further comprising:
   determining a first skill-usage vector associated with the first account, the first skill-usage vector indicating usage of a plurality of skills over a first period of time;
   determining, using a second nearest neighbor algorithm and the first skill-usage vector, a second skill-usage vector grouped together with the first skill-usage vector in a feature space, wherein the second skill-usage vector is associated with a second account;
   determining a first rights vector associated with the first account, wherein each element of the first rights vector corresponds to a respective permissive network action, wherein a value of each element of the first rights vector indicates whether the respective permissive network action is permitted;
   comparing the first rights vector associated with the first account to a second rights vector associated with the second account; and determining skill anomaly data representing at least one unused right associated with the first account based at least in part on the comparing of the first rights vector to the second rights vector, wherein the gradient-based data represents the at least one unused right.

4. A method comprising:

determining, by a first computing device, first computer activity data associated with a first account;

determining a first linear detection event corresponding to the first computer activity data;

determining a set of quantitative data associated with the first linear detection event, wherein the set of quantitative data represents comparative analysis of the first computer activity data with computer activity data of other accounts;

generating first data representing the first linear detection event and the set of quantitative data;

determining a correspondence between the first data and a past linear detection event;

determining that the first linear detection event represents unauthorized computer activity; and modifying, by the first computing device, a data access profile for the first account.

5. The method of claim 4, further comprising:

determining, for a first quantitative network metric, first quantitative network data associated with the first account;

determining a standard deviation for the first quantitative network data relative to quantitative network data for the first quantitative network metric for other accounts; and including the first quantitative network data in the quantitative data based at least in part on the standard deviation exceeding a threshold.

6. The method of claim 4, further comprising:

determining a first category of the first data based at least in part on the first linear detection event and the set of quantitative data; and routing the first data to a first system, wherein the first system is associated with the first category.

7. The method of claim 4, further comprising:

determining, for the first account, second data representing network access rights held by the first account;

determining, using a first nearest neighbor algorithm and the second data, a set of accounts having one or more rights common to the first account;

determining a category label associated with the first account;

determining a number of accounts of the set of individuals having the category label; and generating first quantitative data of the set of quantitative data indicating that the rights held by the first account are anomalous.

8. The method of claim 4, further comprising:

determining a first skill-usage vector associated with the first account, the first skill-usage vector indicating usage of a plurality of skills over a first period of time;

determining, using a second nearest neighbor algorithm and the first skill-usage vector, a second skill-usage vector grouped together with the first skill-usage vector in a feature space, wherein the second skill-usage vector is associated with a second account;

determining a first rights vector associated with the first account, wherein each element of the first rights vector corresponds to a respective permissive network action, wherein a value of each element of the first rights vector indicates whether the respective permissive network action is permitted;

comparing the first rights vector associated with the first account to a second rights vector associated with the second account; and determining skill anomaly data representing at least one unused right associated with the first account based at least in part on the comparing of the first rights vector to the second rights vector, wherein the set of quantitative data represents the at least one unused right.

9. The method of claim 4, further comprising:

determining a first plurality of requests associated with the first account over a first time period;

determining a hierarchical data representation of each request of the first plurality of requests, each of the hierarchical data representations comprising an ordered set of values;

determining a first subset of the first plurality of requests, wherein the hierarchical data representation associated with each request of the first subset includes fewer than a threshold number of value substitutions relative to each other hierarchical data representation of the first subset of the first plurality of requests;

determining a number of unique account identifiers associated with the first subset of the first plurality of requests;

determining a number of hierarchical data representations associated with the first subset of the first plurality of requests;

determining a ratio of the number of unique account identifiers to the number of hierarchical data representations associated with the first subset of the first plurality of requests; and disabling network access to a first service by subsequent requests associated with the first subset of the first plurality of requests.

10. The method of claim 9, further comprising:

determining a threshold ratio; and determining that the ratio of the number of unique account identifiers to the number of hierarchical data representations associated with the first subset of the first plurality of requests is less than the threshold ratio, wherein the modifying the data access profile by subsequent requests associated with the first subset of the first plurality of requests is based at least in part on the ratio of the number of unique account identifiers to the number of hierarchical data representations associated with the first subset of the first plurality of requests being less than the threshold ratio.

11. The method of claim 4, further comprising:

determining a group of accounts having anomalous rights with respect to other individuals having a same category label as the group;

determining that each account of the group reports to a second account; and generating output data comprising instructions to investigate provisioning of the anomalous rights to the group by the second account.

12. The method of claim 4, further comprising:

receiving, by the first computing device, first application log data comprising a plurality of application log actions, wherein the first application log data is associated with the first account;

generating, by a first hidden Markov model associated with the first account, a first hidden state vector based at least in part on the first application log data, wherein a first value of the first hidden state vector is associated with anomalous computer activity;

determining, by the first computing device, a first timing vector associated with the first account, wherein the first timing vector represents first time periods associated with activity of the first account and second time periods associated with inactivity of the first account; and determining a first number of elements of the first hidden state vector having the first value and which correspond to the first time periods of the first timing vector, wherein the first data comprises a comparison of the first number of elements of the first hidden state vector and the first timing vector.

13. A system comprising:

at least one processor; and at least one non-transitory computer-readable memory configured in communication with the at least one processor, the at least one non-transitory computer-readable memory storing instructions that, when executed by the at least one processor, are effective to program the at least one processor to:

determine first computer activity data associated with a first account;

determine a first linear detection event corresponding to the first computer activity data;

determine a set of quantitative data associated with the first linear detection event, wherein the set of quantitative data represents comparative analysis of the first computer activity data with computer activity data of other accounts;

generate first data representing the first linear detection event and the set of quantitative data;

determine a correspondence between the first data and a past linear detection event;

determine that the first linear detection event represents unauthorized computer activity; and modify, by the first computing device, a data access profile for the first account.

14. The system of claim 13, the at least one non-transitory computer-readable memory storing further instructions that, when executed by the at least one processor, are further effective to program the at least one processor to:

determine, for a first quantitative network metric, first quantitative network data associated with the first account;

determine a standard deviation for the first quantitative network data relative to quantitative network data for the first quantitative network metric for other accounts; and include the first quantitative network data in the quantitative data based at least in part on the standard deviation exceeding a threshold.

15. The system of claim 13, the at least one non-transitory computer-readable memory storing further instructions that, when executed by the at least one processor, are further effective to program the at least one processor to:

determine a first category of the first data based at least in part on the first linear detection event and the set of quantitative data; and route the first data to a first system, wherein the first system is associated with the first category.

16. The system of claim 13, the at least one non-transitory computer-readable memory storing further instructions that, when executed by the at least one processor, are further effective to program the at least one processor to:

determine, for the first account, second data representing network access rights held by the first account;

determine, using a first nearest neighbor algorithm and the second data, a set of accounts having one or more rights common to the first account;

determine a category label associated with the first account;

determine a number of accounts of the set of individuals having the category label; and generate first quantitative data of the set of quantitative data indicating that the rights held by the first account are anomalous.

17. The system of claim 13, the at least one non-transitory computer-readable memory storing further instructions that, when executed by the at least one processor, are further effective to program the at least one processor to:

determine a first skill-usage vector associated with the first account, the first skill-usage vector indicating usage of a plurality of skills over a first period of time;

determine, using a second nearest neighbor algorithm and the first skill-usage vector, a second skill-usage vector grouped together with the first skill-usage vector in a feature space, wherein the second skill-usage vector is associated with a second account;

determine a first rights vector associated with the first account, wherein each element of the first rights vector corresponds to a respective permissive network action, wherein a value of each element of the first rights vector indicates whether the respective permissive network action is permitted;

compare the first rights vector associated with the first account to a second rights vector associated with the second account; and determine skill anomaly data representing at least one unused right associated with the first account based at least in part on the comparing of the first rights vector to the second rights vector, wherein the set of quantitative data represents the at least one unused right.

18. The system of claim 13, the at least one non-transitory computer-readable memory storing further instructions that, when executed by the at least one processor, are further effective to program the at least one processor to:

determine a first plurality of requests associated with the first account over a first time period;

determine a hierarchical data representation of each request of the first plurality of requests, each of the hierarchical data representations comprising an ordered set of values;

determine a first subset of the first plurality of requests, wherein the hierarchical data representation associated with each request of the first subset includes fewer than a threshold number of value substitutions relative to each other hierarchical data representation of the first subset of the first plurality of requests;

determine a number of unique account identifiers associated with the first subset of the first plurality of requests;

determine a number of hierarchical data representations associated with the first subset of the first plurality of requests;

determine a ratio of the number of unique account identifiers to the number of hierarchical data representations associated with the first subset of the first plurality of requests; and disable network access to a first service by subsequent requests associated with the first subset of the first plurality of requests.

19. The system of claim 18, the at least one non-transitory computer-readable memory storing further instructions that, when executed by the at least one processor, are further effective to program the at least one processor to:
  determine a threshold ratio; and
  determine that the ratio of the number of unique account identifiers to the number of hierarchical data representations associated with the first subset of the first plurality of requests is less than the threshold ratio, wherein the modifying the data access profile by subsequent requests associated with the first subset of the first plurality of requests is based at least in part on the ratio of the number of unique account identifiers to the number of hierarchical data representations associated with the first subset of the first plurality of requests being less than the threshold ratio.

20. The system of claim 13, the at least one non-transitory computer-readable memory storing further instructions that, when executed by the at least one processor, are further effective to program the at least one processor to:
  determine a group of accounts having anomalous rights with respect to other individuals having a same category label as the group;
  determine that each account of the group reports to a second account; and
  generate output data comprising instructions to investigate provisioning of the anomalous rights to the group by the second account.

* * * * *